US012647268B2

(12) United States Patent
Krasnyansky

(10) Patent No.: US 12,647,268 B2
(45) Date of Patent: Jun. 2, 2026

(54) PRIVACY-PRESERVING IDENTITY VERIFICATION USING BLOCKCHAIN AND GRANULAR DATA CONTROL

(71) Applicant: Serge M Krasnyansky, Miami, FL (US)

(72) Inventor: Serge M Krasnyansky, Miami, FL (US)

( * ) Notice: Subject to any disclaimer, the term of this patent is extended or adjusted under 35 U.S.C. 154(b) by 88 days.

(21) Appl. No.: 18/828,238

(22) Filed: Sep. 9, 2024

(65) Prior Publication Data

US 2026/0074903 A1      Mar. 12, 2026

(51) Int. Cl.
*H04L 29/06*      (2006.01)
*H04L 9/32*      (2006.01)

(52) U.S. Cl.
CPC .......... *H04L 9/3213* (2013.01); *H04L 9/3236* (2013.01)

(58) Field of Classification Search
None
See application file for complete search history.

(56) References Cited

U.S. PATENT DOCUMENTS

| | | | | | |
|---|---|---|---|---|---|
| 10,797,885 | B1 * | 10/2020 | Griffin | ................... | H04L 9/3231 |
| 11,954,238 | B1 * | 4/2024 | Tan | ........................ | H04L 9/0891 |
| 12,155,774 | B1 * | 11/2024 | Kurani | ................... | G06Q 20/02 |
| 12,182,204 | B2 * | 12/2024 | Tran | ..................... | G06Q 20/321 |
| 12,235,984 | B1 * | 2/2025 | Ramesh | ................... | G06F 21/64 |
| 2019/0114334 | A1 * | 4/2019 | Gunther | ................... | G06F 16/27 |

| | | | | | |
|---|---|---|---|---|---|
| 2019/0319987 | A1 * | 10/2019 | Levy | ..................... | H04L 63/205 |
| 2021/0051013 | A1 * | 2/2021 | Li | .......................... | G06Q 40/02 |
| 2022/0141019 | A1 * | 5/2022 | Thomas | ................... | H04L 9/30 |
| | | | | | 713/159 |
| 2022/0200973 | A1 * | 6/2022 | Tola | ..................... | H04L 9/3013 |
| 2022/0398538 | A1 * | 12/2022 | Jakobsson | ............. | H04L 9/3213 |
| 2023/0120534 | A1 * | 4/2023 | Jakobsson | ................ | H04L 9/50 |
| | | | | | 705/39 |
| 2023/0252149 | A1 * | 8/2023 | Jain | ....................... | G06F 21/566 |
| | | | | | 713/168 |

(Continued)

OTHER PUBLICATIONS

Tateishi, T. et al. Automatic smart contract generation using controlled natural language and template. IBM Journal of Research and Development, vol. 63, Issue: 2/3. https://ieeexplore.ieee.org/stamp/stamp.jsp?tp=&arnumber=8645646 (Year: 2019).*

(Continued)

*Primary Examiner* — Jeremiah L Avery
(74) *Attorney, Agent, or Firm* — Hipp Law

(57)      ABSTRACT

Approaches are described for secure identity verification using blockchain technology. A configuration record for a user's identity attributes is obtained. The configuration record is used to evaluate and verify various identity elements through cross-referencing with authoritative sources. Based on the configuration record, identity tokens (KYbits) are generated using cryptographic techniques and stored on a blockchain ledger. These KYbits encapsulate verified identity information and can be utilized in verification processes without disclosing sensitive personal data. The identity tokens enable secure and privacy-preserving transactions across various platforms, ensuring compliance with data protection regulations and enhancing user control over personal identity information.

20 Claims, 11 Drawing Sheets

(56)                    References Cited

U.S. PATENT DOCUMENTS

| 2023/0336355 A1* | 10/2023 | Lewander | H04L 9/0825 |
| 2023/0396453 A1* | 12/2023 | Jain | H04L 9/3213 |
| 2024/0022407 A1* | 1/2024 | Jain | G06N 3/08 |
| 2024/0113880 A1* | 4/2024 | Jain | G06Q 20/36 |
| 2024/0265465 A1* | 8/2024 | Thompson | H04L 9/3213 |
| 2024/0323022 A1* | 9/2024 | Herlands | G06F 21/6245 |
| 2025/0375877 A1* | 12/2025 | Cristache | B25J 9/163 |

OTHER PUBLICATIONS

Zhao, Guichuan et al. Deep Hashing Based Cancelable Multi-Biometric Template Protection. IEEE Transactions on Dependable and Secure Computing, vol. 21, Issue: 4. https://ieeexplore.ieee.org/stamp/stamp.jsp?tp=&arnumber=10330618 (Year: 2023).*
Pilz, A. "Policy-Maker": a toolkit for policy-based security management. 2004 IEEE/IFIP Network Operations and Management Symposium. https://ieeexplore.ieee.org/stamp/stamp.jsp?tp=&arnumber=1317664 (Year: 2004).*

* cited by examiner

_140_

---

Digital Identity Verification Authority (DIVA) 141

| Verification System 146 | Identity Decomposition System 152 |
|---|---|

User Devices 142

Network 104

Distributed Ledger 144

Service Provider(s) 148

Identity Verification Token System 143

---

_300_

502 Obtain user credential data

504 Verify user credential data

506 Verify user consent

507 Segment user credential data data into specific identity elements

508 Map verification questions to validated segmented identity elements

510 Generate identity tokens (e.g., KYbits)

512 Maintain generated identity tokens

514 Make available identity tokens

PRIVACY-PRESERVING IDENTITY VERIFICATION USING BLOCKCHAIN AND GRANULAR DATA CONTROL

BACKGROUND

In our increasingly interconnected society, the sharing of personal information is a routine part of daily transactions and interactions, spanning from online purchases and service applications to car rentals and hotel bookings.

This widespread exchange of personal data is utilized in the operational processes of various industries but introduces significant privacy and security challenges. Traditional identity verification methods, for example, often require individuals to disclose more personal information than is necessary for specific transactions. Using a driver's license to verify one's age also reveals their address, full name, and other unnecessary details, resulting in the overexposure of personal data. Such oversharing amplifies the risks of privacy breaches, identity theft, and the misuse of data, potentially leading to exploitation by malicious actors or mishandling by the verifying entities.

Moreover, individuals typically lack control over the specifics of information shared during verification processes, leading to involuntary and excessive dissemination of their personal data.

Many current systems depend on centralized databases for storing personal information, which creates single points of failure that are susceptible to attacks and data leaks, compromising the security of sensitive data.

The lack of a standardized, interoperable framework for verifying personal attributes across various contexts and platforms introduces inefficiencies and complexities in the verification process, burdening both individuals and organizations.

Diverse efforts to mitigate these issues have led to the development of federated identity management systems, which allow users to access multiple services with a single account, reducing the need for repetitive sharing of personal information. However, such systems still often rely on a central authority for identity management, failing to completely remove centralization risks or the problem of excessive data sharing for certain transactions. Anonymous credential systems aim to enable users to affirm group membership without disclosing their identity, partially addressing privacy concerns but typically lacking the flexibility and ease of use necessary for widespread practical application.

Digital wallets and mobile ID applications have emerged, offering a means to store and selectively share identity documents on personal devices. Despite these advancements, they often do not ensure data minimization, as they still depend on the presentation of traditional identity documents that contain more information than necessary for many transactions. These solutions also struggle with interoperability challenges across different systems and jurisdictions.

Some systems have implemented encryption and selective disclosure techniques to enhance data security. While these methods improve security, they can be complex to implement, may not provide users with the desired granular control over data sharing, and frequently rely on a third-party verifier, introducing potential points of failure or exploitation.

BRIEF DESCRIPTION OF THE DRAWINGS

Various embodiments in accordance with the present disclosure will be described with reference to the drawings, in which.

DETAILED DESCRIPTION

Figure 1A:
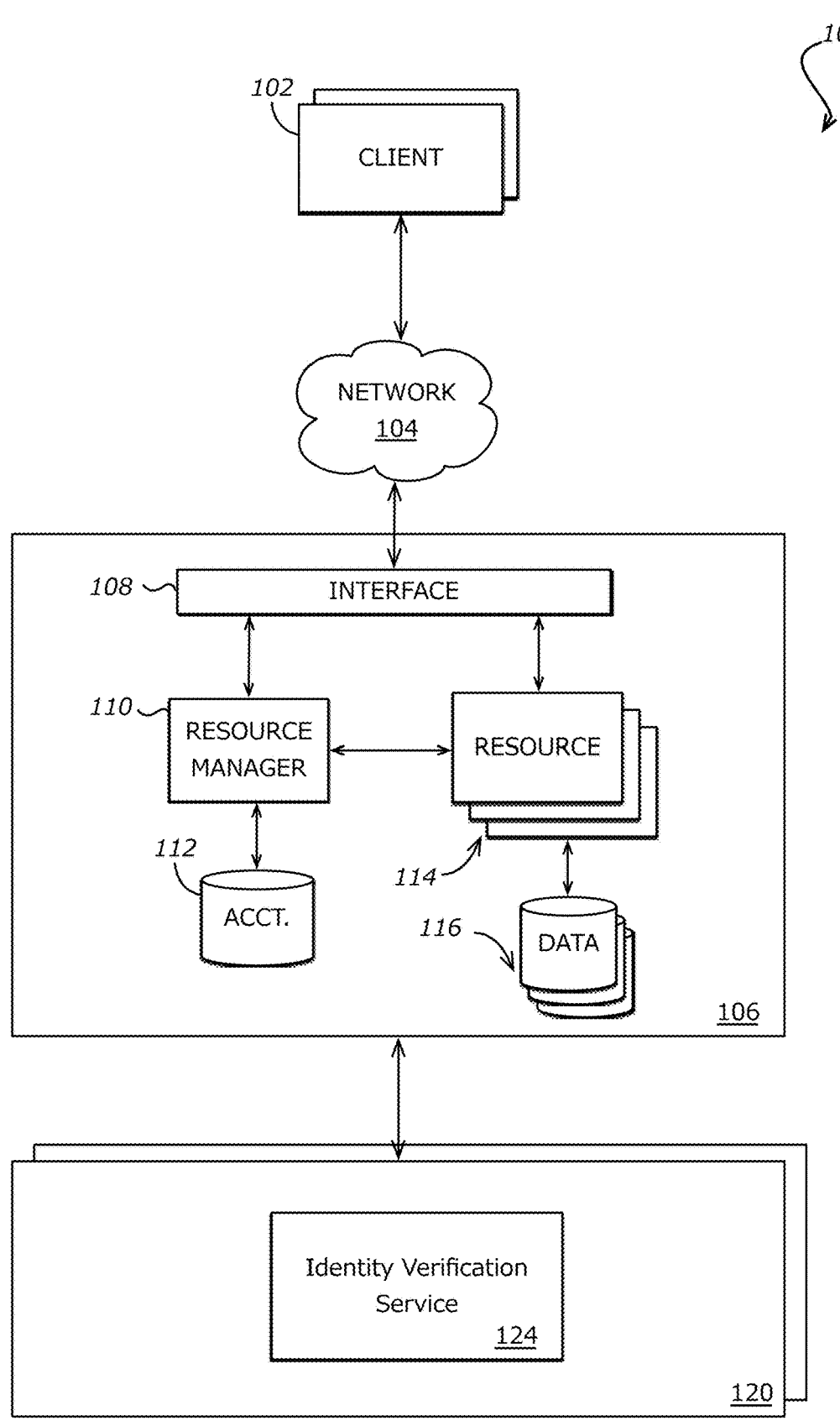
FIG. 1A illustrates an example environment in which aspects of the various embodiments can be implemented.

Systems and methods in accordance with the embodiments described herein overcome various deficiencies in existing approaches to identity verification. In particular, various embodiments utilize a decentralized approach for identity verification, which utilizes a global ledger, such as the blockchain, to create a secure, immutable record of identity attributes and verification transactions. This system emphasizes data minimization, ensuring that necessary pieces of information are disclosed during interactions. Moreover, approaches allow for exchanging identity attributes and other personal data on a network that combines features of both decentralized blockchain architecture and centrally-managed identity verification systems, enabling secure communication and data transfer within commercial and various service-oriented sectors, as well as in real-world settings that require confirmation of identity.

For example, when an individual (referred to as a "user") desires to access services from a provider, the identity verification token system (IVTS) or other such system facilitates this interaction. Instead of partaking in a traditional exchange of comprehensive personal details, the user and the provider engage in a secure, privacy-preserving process. In an embodiment, the IVTS or other such system transforms personal identity attributes, such as a person's identity information, or medical information, termed 'identity attributes'—into a series of distinct, secure, and digital tokens known as KYbits, identity tokens, or attribute token. These KYbits (also referred to as identity tokens or attribute tokens) embody discrete pieces of identity information, sufficient to satisfy specific verification queries without disclosing unnecessary personal data. This selective sharing mechanism significantly mitigates privacy risks, allowing individuals and establishes a new user-centric control over personal identity data within transactional environments.

In various embodiments, individuals have granular control over their identity information, choosing which KYbits to share and with whom, thereby reducing the risk of overexposure and misuse of personal data. This process involves user devices and service providers in a network that securely manages the issuance, storage, and verification of these KYbits, facilitating their use across various transactional contexts.

In certain embodiments, a KYbit is created with a corresponding public-private key pair, where the public key is shareable and the private key remains confidential with the user. This helps to ensure that while KYbits can be shared and verified on the blockchain, their contents cannot be altered without proper authorization, maintaining the integrity of the user's identity information. In an embodiment, to maintain control over the release of binary representations, the system may require user authorization through authentication credentials. These credentials can include cryptographic proofs, such as zero-knowledge proofs or blind signatures, which provide secure and privacy-preserving mechanisms for authorizing access to the sensitive binary data.

In an embodiment, an identity decomposition system (IDS) or other such system is operable to analyze and break down identity documents into the component data to generate KYbits.

In certain embodiments, the system generates verification questions tailored to the specific needs of businesses or service providers. This dynamic question generation helps to ensure that the resulting digital tokens, encapsulating identity verification responses, are directly relevant to the service being requested. An associated processing unit manages and prepares the user's identity data, which is then analyzed and matched against the generated questions to create accurate and verifiable digital tokens. These tokens, representative of the user's identity information, provide precise answers to verification inquiries, facilitating a secure and streamlined verification process across various transactional environments.

In accordance with various embodiments, approaches described herein allow for the secure and efficient exchange of identity information in various forms, including between digital and physical verification systems, and across different sectors that require reliable identity verification. The embodiments described herein are adaptable for a wide range of applications, transcending traditional barriers of interoperability and user control in identity verification.

Advantageously, the systems and methods disclosed herein improve upon existing identity verification processes by providing enhanced data protection and validation. Conventional systems often necessitate the provision of extensive personal information, increasing the risk of data compromise. In contrast, the present system utilizes a blockchain-based ledger to securely encode identity attributes into digital tokens, termed KYbits. Each KYbit encapsulates a specific identity attribute, tailored for the verification process without revealing additional personal information.

This implementation of blockchain technology ensures the integrity of each KYbit by providing a reliable and unalterable verification record. It supports controlled information disclosure, thus advancing the security and efficiency of identity verification procedures. Furthermore, the system minimizes the exposure of personal data, directly addressing privacy and security vulnerabilities inherent in traditional verification methods.

The architecture of the system enhances the verification process by enabling validation of identity attributes while maintaining data confidentiality. This efficiency is achieved by streamlining identity data management, reducing both the storage and processing demands typically associated with extensive personal data handling. Consequently, the system refines identity verification practices, thereby providing an improved method for ensuring data privacy and validation.

Further, embodiments described herein empower users with control over their personal data. Individuals can decide which KYbits to share for each transaction or verification request, providing a level of privacy and autonomy not available in traditional verification methods. This user-centric design is a substantial improvement over prior solutions, which often lack flexibility and do not offer users control over their data.

Further still, the application of blockchain technology addresses the vulnerabilities associated with centralized data storage. By decentralizing the storage of KYbits, the system mitigates the risks of cyber-attacks and data breaches, enhancing the overall security of personal information. This decentralized approach represents a significant advancement over existing systems that rely on centralized databases, which are prone to single points of failure.

Further yet, approaches improve efficiency and interoperability across various platforms and services. The standardized format of KYbits, combined with the blockchain framework, facilitates seamless verification processes, removing the need for repetitive data entries and verifications. This efficiency is particularly beneficial in contexts requiring secure, privacy-focused communications and transactions, streamlining interactions without compromising security or privacy.

Moreover, approaches offer benefits in terms of reducing operational costs for businesses and service providers. By automating the verification process and minimizing the need for manual checks of comprehensive personal information, the system can significantly decrease the costs associated with identity verification. Moreover, the secure and privacy-preserving nature of the verification process enhances trust between parties, which can lead to improved customer relationships and loyalty. The design of the system to share the information also aids in compliance with data protection regulations, such as the General Data Protection Regulation (GDPR) in Europe, further enhancing its applicability and utility in a global context.

Additionally, approaches incorporate components that offer a tailored approach to identity verification, responding to the nuanced requirements of diverse transactional contexts. By generating targeted verification questions, the system helps to ensure that the identity tokens—reflecting verified responses—are aligned with the criteria outlined by service providers. This approach reinforces data privacy by limiting the exchange to information and enhances the verification process's efficacy. Additionally, the preparation and processing of user identity data enables a robust and accurate matching to the generated questions, culminating in the creation of digital tokens that uphold the integrity of the verification process while optimizing user experience and system performance.

Various other functions and advantages are described and suggested below as may be provided in accordance with the various embodiments.

System Architecture

FIG. 1A illustrates an example environment 100 in which aspects of the various embodiments can be implemented. In this example, a user can utilize a client device 102 to communicate across at least one network 104 with a resource provider environment 106. The client device 102 can include any appropriate electronic device operable to send and receive requests or other such information over an appropriate network and convey information back to a user of the device. Examples of such client devices 102 include personal computers, tablet computers, smartphones, notebook computers, and the like. The user can include a person authorized to manage the aspects of the resource provider environment.

The networks 104 may comprise a variety of forms such as intranets, the Internet, cellular networks, and local area networks (LANs). These networks facilitate communication that can be enabled through both wired and wireless means, ensuring seamless interaction within the identity verification ecosystem, which leverages blockchain's decentralized nature to enhance privacy and security. This intricate network web supports the data exchanges for the operation of the identity verification service 124 and other related systems and components.

The resource provider environment 106 includes an identity verification service 124, configured to enhance privacy and security during identity data exchanges and validations. The identity verification service 124 utilizes blockchain technology to maintain an immutable ledger. In this architecture, a public-private key framework is employed where public keys serve as unique identifiers, and private keys are used for the encryption and decryption of identity tokens (e.g., KYbits or attribute tokens). The private key helps to ensure that authorized users can access and decode the identity attributes stored on the blockchain. It is designed for data minimization by selectively disclosing identity attributes for transactions and supports their secure transfer across various platforms and in-person interactions. In an embodiment, blockchain technology underpins the architecture of the proposed identity verification system, which utilizes a public-private key framework. Here, public keys serve as unique identifiers within the network, while private keys are confidential and employed for the encryption and decryption of identity tokens. This helps to ensure that while identity attributes, once tokenized into KYbits, can be shared and verified, their underlying data remains secure and tamper-evident. When a user's identity data is tokenized, a corresponding private key is generated and securely stored, from which a public key can be algorithmically derived. These keys form the basis for creating and managing digital identities, where the public key is akin to an address that others can see and interact with, and the private key remains known to the individual user, safeguarding access to their identity information.

In certain embodiments, the private key enables a user to control access to their identity attributes within the system, which includes, e.g., medical records, identity details, and other pertinent information. In certain embodiments, a digital identity wallet, analogous to a cryptocurrency wallet, automatically generates and securely stores private keys. These wallets maintain private and public keys and interact with the blockchain to enable users to share identity information and monitor which aspects of their identity are being utilized.

They may take the form of software-based wallets accessible via desktop, mobile, or online platforms—where desktop wallets are installed on a single computer, online wallets are cloud-based and accessible from any device, and mobile wallets are operated through apps on portable devices. Alternatively, hardware wallets store private keys on a physical device like a USB drive, providing offline storage for increased security. They can interface with a variety of web platforms and support various identity tokens. Additionally, a physical printout of the public and private keys, known as a paper wallet, may be generated through a secure process. When a user wishes to validate their identity or share specific identity tokens, the digital identity wallet utilizes the private key to sign the transaction, thereby verifying to the blockchain network that the transaction is authorized by the rightful owner of the digital identity.

In an embodiment, the private key controls access to a user's identity attributes. The system may also interface with physical authentication tokens such as barcodes, cards with embedded chips, or sophisticated 3D barcodes and matrices. These items, when scanned or read by appropriate devices, complement the digital identity wallet by providing an additional layer of security and convenience for identity verification in physical transactions. Cards with chips may store encrypted identity data that can be quickly and securely verified against the user's digital identity wallet, enhancing the user's control over personal data. Barcodes and 3D matrices can represent complex data structures in a condensed form, easily scanned from a user's mobile device or a printed medium, facilitating a seamless and secure exchange of identity attributes. Together with the blockchain infrastructure, these physical-digital hybrid solutions create a robust, multi-faceted approach to identity management, providing users with a range of options to assert their identity across various platforms and environments.

The verification service 124 can include or be in communication with one or more other components/services, including, for example, digital identity verification authority (DIVA) 141, which is comprised of at least verification system 146 and identity decomposition system 152, distributed ledger 144, identity verification token system 143, service providers 148, among other such components. The systems and components may be hosted on multiple server computers and/or distributed across multiple systems. Additionally, the systems and components may be implemented using any number of different computers and/or systems. Thus, the systems may be separated into multiple services and/or over multiple different systems to perform the functionality described herein.

The servers in the environment, which may include web and application servers, work in tandem with identity verification service 124 to process requests securely. The identity verification service 124 may leverage multi-factor authentication methods to ensure authorized access to private data, reinforcing user control over their personal information.

In various embodiments, resource provider environment 106 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that a detailed description of the entire process, and explanation of all possible components, will not be discussed in detail herein. In this example, resource provider environment 106 includes a plurality of resources 114 of one or more types. These types can include, for example, application servers operable to process instructions provided by a user or database servers operable to process data stored in one or more data stores 116 in response to a user request. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 102 that needs to access resources of the resource provider environment 106, for example, to manage identity verification service 124, implemented as one or more services to which the application has subscribed, can submit a request that is received to interface layer 108 of the resource provider environment 106. The interface layer 108 can include application programming interfaces (APIs) or other exposed interfaces, enabling a user to submit requests, such as Web service requests, to the resource provider environment 106. Interface layer 108, in this example, can also include a scalable set of customer-facing servers that can provide the various APIs and return the appropriate responses based on the API specifications. Interface layer 108 also can include at least one API service layer that, in one embodiment, consists of stateless, replicated servers that process the externally-facing customer APIs. The interface layer can be responsible for Web service front-end features such as authenticating customers based on credentials, authorizing the customer, throttling customer requests to the API servers, validating user input, and marshaling or unmarshaling requests and responses. The API layer also can be responsible for reading and writing database configuration data to/from the administration data store, in response to the API calls. In many embodiments, the Web services layer and/or API service layer will be the only externally visible component or the only component that is visible to and accessible by customers of the control service. The servers of the Web services layer can be stateless and scaled horizontally, as known in the art. API servers, as well as the persistent data store, can be spread across multiple data centers in a region, for example, such that the servers are resilient to single data center failures.

When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106. The resource manager can, in some embodiments, authenticate the user in accordance with embodiments described herein based on voice data provided by the user.

A host machine 120 in at least one embodiment can host identity verification service 124. It should be noted that although host machine 120 is shown outside the provider environment, in accordance with various embodiments, identity verification service 124 can be included in resource provider environment 106, while in other embodiments, one or the other can be included in the provider environment. In various embodiments, one or more host machines can be instantiated to host such systems for third-parties, additional processing of preview requests, and the like.

Figure 1B:
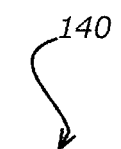
FIG. 1B illustrates an exemplary embodiment of a secure and privacy-preserving verification system according to an embodiment.

FIG. 1B illustrates an exemplary embodiment 140 of a secure and privacy-preserving verification system according to an embodiment. In an embodiment, the system may be comprised of a user device(s) 142; distributed ledger 144; digital identity verification authority (DIVA) 141 comprising at least verification system 146 and identity decomposition system 152; verification system 146; identity decomposition system 152; service provider(s) 148; identity verification token system 143; and a network 104 over which the various systems or components communicate and interact.

Distributed ledger 144 serves as a secure, immutable repository for the documentation of transactions and identity verification activities within the identity verification service 124. It employs blockchain technology or similar systems to ensure the permanency and unalterability of records, thereby establishing a dependable audit trail for all interactions within the service. This ledger utilizes a structure that prevents tampering, guaranteeing that each record remains permanent and verifiable. Through its architecture, which may be decentralized or based on equivalent principles, it offers a method for validating transactions that does not rely on a central authority, enhancing transparency and auditability of transaction histories while safeguarding against unauthorized changes and data compromises. Such an allows for preserving the integrity and confidentiality of sensitive data, promoting a secure environment for the exchange and verification of identity and other pertinent information within the service. Additionally, in certain embodiments, the system may employ a ledger that is not entirely distributed. This could involve a portion or all of the ledger's operations being maintained on a centralized or semi-centralized platform. This approach may be utilized for specific operational efficiencies, regulatory compliance, or to facilitate integration with legacy systems that require a central authority for certain transactions or identity verification processes. Such configurations allow the system to flexibly adapt to varying requirements and use cases, ensuring broad applicability and operational effectiveness across different sectors and transaction types. This hybrid approach combines the benefits of both distributed and centralized systems, offering a versatile solution for identity verification and data management within the identity verification service 124.

Distributed ledger 144 is architected to be a secure and immutable repository within the identity verification service 124, facilitating the recording of transactions and verification events. Its operation on blockchain technology or equivalent ensures the durability and integrity of records, providing a reliable audit trail for interactions within the system. This ledger operates without the need for a central authoritative figure by employing a decentralized structure across numerous network nodes, which bolsters security against potential data alterations and unauthorized interventions.

The process for adding records to distributed ledger 144, encompassing activities such as the creation, verification, and utilization of KYbits, can be based on a consensus mechanism among network participants, ensuring the accuracy and dependability of the stored data.

In various embodiments, distributed Ledger 144's interface with system components like digital identity verification authority (DIVA) 141, identity verification token system (IVTS) 143, and identity decomposition system (IDS) 152, underpins the efficient handling and verification of identity information.

In an embodiment, distributed Ledger 144 is not confined to identity verification; it is utilized in facilitating secure transactions and the protection of sensitive data, serving roles in healthcare, financial services, and government sectors, among others. Its compatibility with physical verification tools, such as barcodes and chip-embedded cards, extends its utility to encompass in-person verification scenarios, thereby presenting a unified solution for verifying identities both in digital and tangible domains.

In an embodiment, service provider(s) operate as entities that request verification of specific user information to facilitate services or transactions while prioritizing user privacy and data minimization. Engaging with the blockchain network or a similar decentralized ledger, these providers query for verification results, receiving responses in the form of KYbits—a form of binary-answerable, securely signed data elements tailored for privacy-preserving data exchange.

Service provider 148 requests verification of specific user information to facilitate its services or transactions. It interacts with the blockchain network, querying and receiving verification results in the form of KYbits. This process allows service provider 148 to obtain the information required for verification, without accessing the user's full personal details.

The system works by sending a verification request to the blockchain network. This request contains specific queries related to the user's information. Upon receiving a verification request, the system retrieves the corresponding KYbits using the user's private key to decrypt the stored information on the blockchain. This step helps to ensure that the identity attributes can be accessed and verified by authorized entities, maintaining data privacy and security throughout the process. The blockchain network responds with verification results in the form of KYbits, which are binary-answerable data elements securely signed and stored in the secure data repository. The service provider 148 then uses these KYbits to verify the user's information without accessing their full personal details.

Alternatives to the service provider 148 could involve different methods of requesting and receiving user verification. For example, the service provider could interact with a centralized database instead of a blockchain network to request and receive verification. Another alternative could involve the service provider using different types of data elements, such as tokens or encrypted strings, instead of KYbits for verification. Additionally, the service provider could use artificial intelligence or machine learning algorithms to analyze the received data and determine its authenticity.

Digital identity verification authority (DIVA) 141 comprises at least verification system 146 and the identity decomposition system 152. In an embodiment, digital identity verification authority (DIVA) 141 is operable to orchestrate the processes of verifying and managing digital identities across a distributed network.

In one embodiment, identity decomposition system 152 is operable segment a user's data into discrete identity elements. In an embodiment, segmenting user data may be prior to any verification processes. Identity decomposition system 152 may utilize a combination of machine learning, pattern recognition, and encryption technologies to ensure that each identity element is securely processed and stored.

In an embodiment, identity decomposition system 152 comprises one or more components operable to dissect user data into finer, manageable identity elements. For instance, in an embodiment, identity decomposition system 152 receives user data from a user or another component within the system. The user data can be analyzed to identify and extract identity attributes or elements from the data. The identity attributes or the identity elements can be stored. In an embodiment, the identity attributes or the identity elements can be verified and or used for another purpose.

In certain embodiments, identity decomposition system 152 is capable of adapting its decomposition algorithms based on the context of the verification requirement. In an embodiment, identity decomposition system 152 may introduce varying levels of decomposition granularity, offering tailored identity verification solutions that range from broad to highly specific verification scenarios. Components of identity decomposition system 152 are further described in detail in FIG. 2.

In one embodiment, verification system 146 is operable to authenticate user-provided data against established external sources or criteria. Verification system 146 ensures the reliability and accuracy of the identification documents submitted by users, such as passports, driver's licenses, or state IDs.

In an embodiment, verification system 146 is operable to interface with a variety of data sources to verify the authenticity of identification documents. Verification system 146 may utilize a combination of optical character recognition (OCR) technology, digital signature verification, and cross-referencing with public and proprietary databases to perform checks. Through these processes, verification system 146 assesses the validity of document features, including but not limited to, security marks, holograms, and embedded electronic chips.

In one embodiment, verification system 146 begins with the receipt of digital copies of identification documents, which are then processed through OCR to extract textual data. Subsequently, digital signatures and unique identifiers embedded within the documents are verified against external databases. Verification system 146 may employ algorithms to detect anomalies or discrepancies that may indicate fraudulent or tampered documents. In certain embodiments, alternatives to the verification process include the use of biometric data verification, such as facial recognition technology, to match the document photo against a live image of the user. This adds an additional layer of security by ensuring the person presenting the document is its rightful owner. For example, when a user submits a digital copy of their passport for verification, verification system 146 analyzes the document for security features such as watermarks, holograms, and machine-readable zones. It then compares the extracted information against international passport databases to confirm its validity. Components of verification system 146 are further described in detail in FIG. 3.

In accordance with various embodiments, identity verification token system (IVTS) 143 is operable to generate and manage KYbits. As described, a KYbit can represent a digital representation of verified user information. In various embodiments, the KYbit can be tailored to the verification needs of service providers.

Identity verification token system (IVTS) 143 may include one or more components to generate these KYbits. In an embodiment, identity verification token system (IVTS) 143 may work in conjunction with the distributed ledger 144, which acts as a decentralized framework ensuring the integrity and immutability of the KYbits. Each KYbit, upon creation, is registered and logged on the distributed ledger 144, providing an indelible record of the identity verification event.

In various embodiments, identity verification token system (IVTS) 143 facilitates the issuance of KYbits in response to verification requests from service providers 148. For example, when a request for KYbits is received, the system retrieves the requested KYbits and provides them to the requestor, provided that the requestor has the necessary permissions. In an embodiment, these requests can be processed through smart contracts or similar automated mechanisms residing on the distributed ledger 144, ensuring that the KYbits are generated and provided in a manner consistent with the predefined rules and conditions of the system.

In certain embodiments, a secure data repository (SDR) may be introduced as an additional layer of data protection. For example, the SDR can serve as a secure storage facility, safeguarding sensitive user information and the corresponding KYbits. It can act as a safeguard for backups, recovery processes, or for storing large data volumes that are impractical to maintain on the distributed ledger due to size or cost considerations. The SDR may employ advanced encryption and access controls, ensuring that KYbits are disclosed to authorized entities in compliance with privacy regulations and user consent. Alternatives to secure data repository could include different types of secure storage systems. For example, the data could be stored in a cloud-based storage system that uses encryption and access control mechanisms. Another alternative could be a hybrid storage system that combines elements of both centralized and distributed storage systems.

In an embodiment, a user device(s) 142 communicates with digital identity verification authority (DIVA) 141 and identity verification token system 143 for the verification and transformation of personal information into secure, granular data elements, or KYbits. These KYbits are stored on distributed ledger 144, with operations facilitated on distributed ledger 144. Service provider(s) 148 can request the verification of specific data points through the blockchain, receiving the necessary information, thus maintaining user privacy. The various components described herein are exemplary and for illustration purposes only, and any combination or subcombination of these components may be used as would be apparent to one of ordinary skill in the art. The system may be reorganized or consolidated to perform the same tasks on one or more other servers or computing devices without departing from the scope of the invention.

User device(s) 142 include, generally, a computer or computing device including functionality for communicating (e.g., remotely) over a network 104. Data may be collected from user devices 142, and data requests may be initiated from each user device 142. User device(s) 142 may be a server, a desktop computer, a laptop computer, personal digital assistant (PDA), an in- or out-of-car navigation system, a smartphone, or other cellular or mobile phone, or a mobile gaming device, among other suitable computing devices. User devices 142 may execute one or more applications, such as a web browser or a dedicated application to submit user data, or to make prediction queries over a network 104.

In particular embodiments, each user device 142 may be an electronic device including hardware, software, or embedded logic components or a combination of two or more such components and capable of carrying out the appropriate functions implemented or supported by the user device 142. For example and without limitation, a user device 142 may be a desktop computer system, a notebook computer system, a netbook computer system, a handheld electronic device, or a mobile telephone. The present disclosure contemplates any suitable user device 142. A user device 142 may enable a network user at the user device 142 to access network 104. A user device 142 may enable its user to communicate with other users at other user devices 142.

A user device 142 may have a web browser, such as MICROSOFT INTERNET EXPLORER, GOOGLE CHROME, or MOZILLA FIREFOX, and may have one or more add-ons, plug-ins, or other extensions, such as a TOOLBAR or YAHOO TOOLBAR. A user device 142 may enable a user to enter a Uniform Resource Locator (URL) or other address directing the web browser to a server, and the web browser may generate a Hyper Text Transfer Protocol (HTTP) request and communicate the HTTP request to the server. The server may accept the HTTP request and communicate to the user device 142 one or more Hyper Text Markup Language (HTML) files responsive to the HTTP request. The user device 142 may render a web page based on the HTML files from the server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 142 may also include an application that is loaded onto the user device 142. The application obtains data from the network 104 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network 104 generally represents a network or collection of networks (such as the Internet or a corporate intranet, or a combination of both) over which the various components illustrated in FIG. 1B (including other components that may be necessary to execute the system described herein, as would be readily understood to a person of ordinary skill in the art). In particular embodiments, network 104 is an intranet, an extranet, a virtual private network (VPN), a local area network (LAN), a wireless LAN (WLAN), a wide area network (WAN), a metropolitan area network (MAN), a portion of the Internet, or another network 104 or a combination of two or more such networks 104. One or more links connect the systems and databases described herein to the network 104. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 104, and any suitable link for connecting the various systems and databases described herein.

The network 104 connects the various systems and computing devices described or referenced herein. In particular embodiments, network 104 is an intranet, an extranet, a virtual private network (VPN), a local area network (LAN), a wireless LAN (WLAN), a wide area network (WAN), a metropolitan area network (MAN), a portion of the Internet, or another network 104 or a combination of two or more such networks 104. The present disclosure contemplates any suitable network 104.

One or more links couple one or more systems, engines or devices to the network 104. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 104.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1B, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
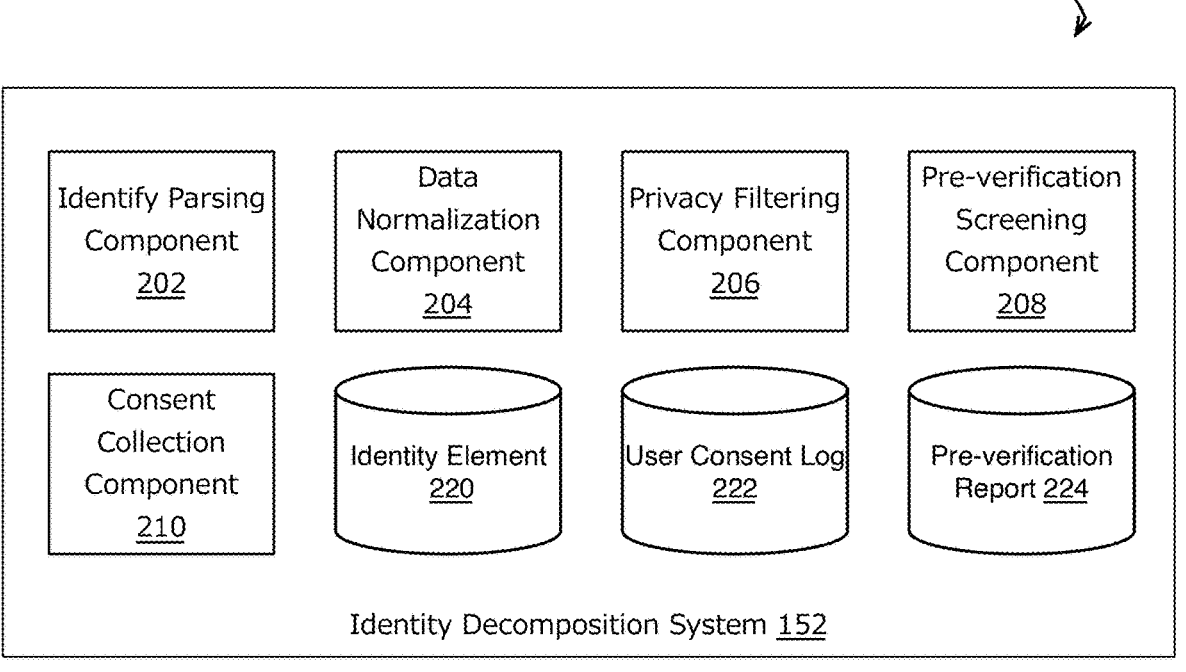
FIG. 2 illustrates an exemplary view of identity decomposition system in accordance with various embodiments.

FIG. 2 illustrates an exemplary view 200 of identity decomposition system, including subcomponents and their roles in preparing user data for secure and privacy-conscious processing, in accordance with various embodiments. In this example, identity decomposition system 152 includes components such as identity parsing component 202, data normalization component 204, privacy filtering component 206, pre-verification screening component 208, consent collection component 210, identity element data store 220, user consent log 222, and pre-verification report store 224.

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Identity parsing component 202 is operable to segment user data into specific identity elements. That is, identity parsing component 202 divides identity data into discrete, manageable units that can be individually analyzed and processed further within the system. In an embodiment, the data can be obtained from user inputs during online forms, document uploads, or through automated data extraction mechanisms employed by connected systems such as identity decomposition system 152.

In an embodiment, identity parsing component 202 comprises data segmentation algorithms that parse complex data sets into simpler, discrete identity elements. These elements might include, for example, names, addresses, dates of birth, biometric data, and other personal identifiers. In an embodiment, these elements may be stored in, for example, identity element data store 220. Identity parsing component 202 is operable to to handle various data formats, from structured database entries to unstructured text from scanned documents. In an example, once data is obtained, identity parsing component 202 executes its segmentation protocols to isolate and label each piece of identity data. This operation typically involves pattern recognition techniques and could also integrate machine learning models to improve accuracy over time with more data processed.

Alternatives to traditional parsing methods employed by identity parsing component 202 may include natural language processing (NLP) techniques to handle unstructured text or dynamic parsing algorithms that adapt based on the data type and source. In certain embodiments, the component might utilize external libraries for specialized parsing needs, such as extracting data from complex legal or medical documents.

In an example use case, when a user uploads a document containing personal information, identity parsing component 202 extracts relevant identity data elements from the document. These elements are then normalized and screened for privacy concerns by subsequent components, ensuring that the data used in the identity verification process is both accurate and compliant with data protection regulations.

Data normalization component 204 is operable to standardize the segmented identity elements. In an embodiment, this may include, for example, standardizing the segmented identity elements received from the identity parsing component 202. This standardization helps to ensure that data from diverse sources and formats are converted into a uniform format, facilitating further processing and analysis within the identity verification system. In an embodiment, data may be obtained from a variety of sources, including digital forms submitted by users, documents processed through the system, or data streams received via API integrations with external databases. The data may include, for example, names, addresses, date of birth records, and other personal identifiers that have been segmented by Identity Parsing Component 202.

The data normalization component 204 comprises algorithms designed to convert varied data formats into a standardized form. This involves aligning disparate data entries to a common data schema, correcting inconsistencies in data presentation (such as date formats or address structures), and resolving discrepancies in data spelling or syntax.

Operationally, once data normalization component 204 receives segmented identity elements from the identity parsing component 202, it applies normalization rules that have been predefined according to the system's requirements. This process may involve parsing strings, standardizing date formats, and harmonizing numerical data such as phone numbers or social security numbers.

In certain embodiments, alternatives to traditional normalization techniques might include machine learning models trained to recognize and adapt to new data formats dynamically, thereby improving the component's ability to handle unexpected or previously unknown data types. Another alternative might be the use of blockchain technology to securely and immutably record the normalization rules and their application to data, enhancing the transparency and auditability of the normalization process.

Through its interaction with both upstream components like identity parsing component 202 and downstream systems such as the privacy filtering component 206, data normalization component 204 helps to ensure that well-structured, uniform data progresses through the verification pipeline. This interaction often involves significant data exchange, where normalized data is transmitted to other system components for further processing or stored in databases like the identity element data store 220.

An example use case of data normalization component 204 would be the processing of a batch of user-submitted documents containing personal information. After the identity elements are extracted and segmented by identity parsing component 202, they can be forwarded to data normalization component 204, which standardizes the data for consistency. This standardized data can then be effectively used across the system for identity verification processes, ensuring accuracy and reliability in user identity validation.

Privacy filtering component 206 is operable to selectively remove or obscure unnecessary or sensitive information from identity elements prior to further processing. In short, privacy filtering component 206 helps to ensure that relevant and minimal data is retained, enhancing user privacy and compliance with data protection regulations. In an embodiment, the data may be obtained from identity element data store 220, where it has been stored following standardization by data normalization component 204.

In an embodiment, privacy filtering component 206 may comprise several layers of data filtering algorithms designed to assess and classify data based on its sensitivity and relevance to the specific verification process underway. In an embodiment, data enters the system from identity parsing component 202 or directly from external sources via APIs that supply real-time data streams. The data may include, for example, personally identifiable information (PII), financial details, or health-related information.

Privacy filtering component 206 evaluates the data against predefined privacy rules and contextual requirements. This evaluation determines whether data should be retained, anonymized, or entirely removed from the dataset. Anonymization techniques used may involve replacing original data with tokens or pseudonyms, effectively separating the data from direct identifiers, thereby reducing privacy risks.

In an embodiment, operational flow within privacy filtering component 206 involves receiving segmented identity elements from data normalization component 204, applying the privacy rules to assess each element's necessity and sensitivity, and then either passing the filtered data forward to pre-verification screening component 208 or storing it back into identity element data store 220 for future reference. The process helps to ensure that the data utilized for verification purposes is processed further, minimizing the footprint of sensitive data within the system.

In certain embodiments, alternatives to static filtering rules might include adaptive filters that learn from ongoing privacy assessments and user feedback to refine their filtering criteria dynamically. This adaptive approach allows the system to remain flexible and responsive to evolving privacy norms and regulatory requirements.

Through its interaction with other system components, privacy filtering component 206 helps to maintain data integrity and privacy. For example, before data is sent to consent collection component 210 for user consent verification, privacy filtering component 206 helps to ensure that the necessary data elements are presented to the user, thereby simplifying the consent process and adhering to principles of minimum data exposure.

In accordance with an example use, consider a scenario where user data from a healthcare application is processed. privacy filtering component 206 might receive detailed medical histories but filters out specific details that are not required for the service being applied for, such as historical treatment information unrelated to a current condition. This filtered dataset then proceeds to the next stages of verification, ensuring compliance with healthcare data regulations and reducing the risk of data breaches.

Pre-verification screening component 208 is operable to conduct initial checks on identity elements to assess their integrity and readiness for deeper verification processes. In short, pre-verification screening component 208 helps to ensure that data satisfies pre-set criteria proceeds to subsequent verification stages.

In an embodiment, pre-verification screening component 208 obtains data from the privacy filtering component 206, which has minimized unnecessary or sensitive information. This data comprises, for example, standardized identity elements prepared by the data normalization component 204. These elements may include, for example, biometric data, personal identification numbers, and other sensitive information that has been transformed into a more secure format. In an embodiment, these elements may be stored in pre-verification report store 224.

In an embodiment, pre-verification screening component 208 comprises algorithms and processes designed to evaluate the identity elements for completeness, accuracy, and potential fraud. Initially, it performs a series of automated checks to identify any discrepancies or anomalies that could indicate issues such as data corruption, incomplete data sets, or attempted security breaches.

In an embodiment, pre-verification screening component 208 uses a combination of rule-based and heuristic analysis techniques to assess the data. For example, pre-verification screening component 208 might check for data consistency by comparing new input data against historical data patterns stored in identity element data store 220. Similarly, pre-verification screening component 208 might use heuristic algorithms to predict potential data integrity issues based on emerging data trends.

In certain embodiments, pre-verification screening component 208 may interface with external verification systems to cross-reference information. This could involve sending queries to external databases to validate certain data elements before they are used in the creation of KYbits or other identity tokens.

In accordance with an example use, if a user submits a government-issued ID for verification, pre-verification screening component 208 might first verify the format and completeness of the ID number and the user's name as they appear in the submitted document. Pre-verification screening component 208 checks these elements against known formats and field requirements to ensure they meet the criteria for a valid submission.

Consent collection component 210 is operable to gather and manage user consent at the initial stages of data collection, ensuring compliance with privacy regulations and user preferences. It serves as an interface for obtaining consent from users before any data processing occurs.

In an embodiment, consent collection component 210 may obtain consent directly from users through various user interfaces, including web forms, mobile applications, or other digital platforms designed for explicit consent gathering. Alternatively, consent may be collected through API integrations with third-party platforms that facilitate digital agreements. The consent data typically includes user agreements, preferences, and permissions regarding the processing of their personal and sensitive data. This consent data, along with records of consent, is securely stored in the user consent log 222.

Technically, consent collection component 210 comprises a set of functionalities designed to handle the logistics of consent collection, storage, and management. It interacts with other components of the identity verification system, such as identity parsing component 202 and privacy filtering component 206, ensuring that all data processed is in line with the consents obtained from users. More specifically, consent collection component 210 maintains a secure and accessible log of all consent-related actions and preferences in the user consent log 222. This log serves as an auditable trail of consent transactions, providing transparency and accountability in consent management practices.

In certain embodiments, consent collection component 210 employs automated tools to monitor and track changes in user consent. These tools can automatically update the system to reflect any modifications in user consent preferences, such as when a user revokes consent for a particular type of data processing.

In an example use case, consent collection component 210 may interface with the user consent log 222 to verify whether a user has consented to a new data processing activity. For instance, if a service provider introduces a new feature requiring additional data sharing, the component can check the log to ensure that the user has given explicit consent for this activity. Upon confirming consent, the component facilitates the secure transmission of user data to the designated external party, strictly adhering to the user-specified guidelines.

Figure 3:
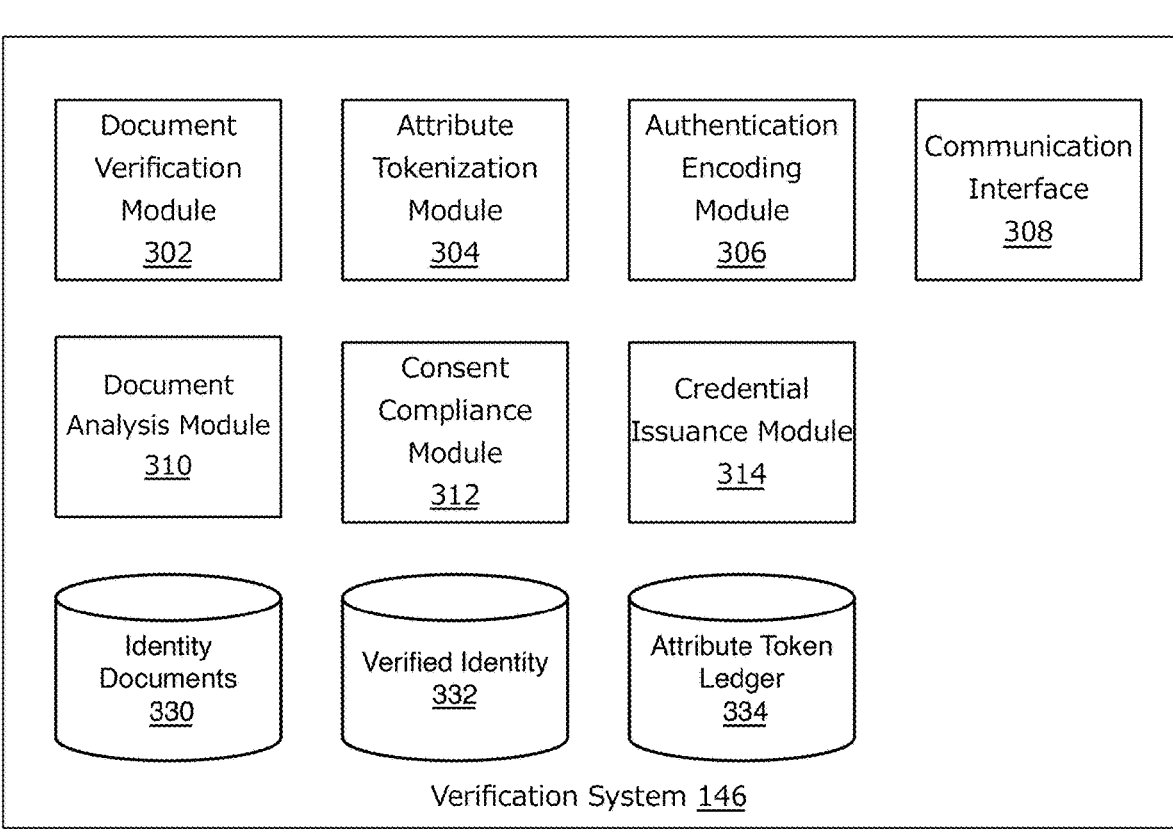
FIG. 3 illustrates an exemplary view of verification system in accordance with various embodiments.

FIG. 3 illustrates an exemplary view 300 of verification system 146, including its subcomponents and their roles in the process of verifying user information and generating secure data elements, in accordance with various embodiments. In this example, verification system 146 includes document verification module 302, attribute tokenization module 304, authentication encoding module 306, communication interface 308, document analysis module 310, consent compliance module 312, credential issuance module 314, identity documents data store 330, verified identity data store 332, and attribute token ledger 334.

Document verification module 302 is operable to authenticate documents provided by users. In certain embodiments, document verification module 302 is operable to verify the accuracy of the data contained within these documents.

In an embodiment, the documents can be obtained via a GUI or other such interface from users. In various embodiments, document verification module 302 may use APIs, data uploads or other approaches to obtain the documents. The documents may include, e.g., as well as educational certificates, employment records, utility bills for proof of address, bank statements, and immigration documents. In an embodiment, each type of document may be subject to specific verification protocols tailored to its unique features and the type of information it contains.

Document verification module 302 may employ one or more approaches to authenticate documents and/or verify the accuracy of the data contained within these documents. In an embodiment, document verification module 302 includes or is in communication with optical character recognition (OCR) component to digitize text from documents for analysis. In an embodiment, document verification module 302 may utilize image processing algorithms to examine security features like watermarks, holograms, and embedded electronic chips.

In some embodiment, document verification module 302 is configured to interface with external systems or databases, enabling the comparison of document features and information against trusted sources to authenticate documents effectively. For instance, document verification module 302 can send and receive information in a structured format that aligns with the requirements of external verification services or databases. This exchange enables document verification module 302 to cross-reference and verify the authenticity of documents by comparing the extracted document features—such as text, images, and electronic signatures—with those recorded in external trusted databases.

In an embodiment, document verification module 302 incorporates mechanisms for manual intervention, where documents or specific data therein may be subjected to review by human operators. For instance, document verification module 302 may flag one or more documents and/or sections of documents for review by human operators if inconsistencies or anomalies are detected during the automated analysis. These operators can visually inspect the documents and cross-reference the information with external databases. Another alternative is using third-party verification services that specialize in document authentication. These services often have access to extensive databases and sophisticated technologies for document verification. Lastly, blockchain-based verification solutions can be used as an alternative. These solutions provide decentralized document validation mechanisms, ensuring that the verification process is transparent and tamper-proof.

Document verification module 302 may utilize one or more machine learning techniques to analyze documents. For example, document verification module 302 assigns an authenticity score to each document or specific data within the document. This score quantifies the likelihood of the document being authentic. For example, a high score may indicate a high probability of authenticity, thereby reducing the need for further review, while a lower score may signal potential issues, prompting additional verification steps, potentially involving manual review or further automated analysis.

Document verification module 302 may obtain may obtain documents that have already been authenticated from authoritative sources. For instance, a driver's license or passport might be directly verified by querying governmental databases designated for such purposes. These databases, managed by official agencies, securely house records of issued documents, complete with detailed features such as document numbers, expiration dates, and biometric data.

Document analysis module 310 is operable to analyze the documents to extract necessary information and attributes for verification. In an embodiment, document analysis module 310 comprises algorithms for text and image analysis, including optical character recognition (OCR) to convert different types of documents into machine-readable text. Document analysis module 310 comprises image analysis capabilities to detect and interpret visual elements such as logos, signatures, and stamps. For example, in processing a government-issued ID, the module would use OCR to extract personal details from the text and image analysis to verify the authenticity of the photograph and signature against stored templates.

In an example operational flow, document analysis module 310 obtains the initial receipt of documents, followed by pre-processing steps such as format normalization and noise reduction. In an embodiment, the OCR process then extracts textual data, which is further analyzed for accuracy and completeness.

Document analysis module 310 in certain embodiments may cross-reference the extracted information against external databases for additional verification.

In certain embodiments, alternatives to OCR, such as natural language processing (NLP) for understanding unstructured text, or deep learning models for image recognition, provide enhanced accuracy and flexibility. These alternatives can adapt the verification process to documents with complex layouts or those containing a mix of text and graphical elements.

In various embodiments, document analysis module 310 interacts with other components, such as the document verification module 302 and identity verification token system 143, document analysis module 310 facilitates a review of documents. Document analysis module 310 helps to ensure that valid, authentic documents contribute to the creation of KYbits or influence the verification outcome.

Potential applications of document analysis module 310 extend beyond document authentication. It can be used for content-based document classification, extraction of specific information for automated form filling, or even to support compliance checks against regulatory requirements.

Attribute tokenization module 304 is operable to convert the extracted attributes from documents or data inputs into a tokenized format. This transformation facilitates the secure management and exchange of sensitive user information by converting it into anonymized tokens.

In an embodiment, the data can be obtained through direct user input, automated data extraction from documents by document analysis module 310, or via API integrations with external data sources. The data may include, for example, personal identification numbers, biometric data, and other identifiable information that requires secure processing and storage.

Attribute tokenization module 304 comprises a data processing unit that applies tokenization algorithms to the extracted data attributes. This process involves replacing sensitive data elements with non-sensitive equivalents, known as tokens, which reference the original data but do not expose its content. The module is designed to interface with other system components, such as document verification module 302 and authentication encoding module 306, to ensure the transition of data through the verification and encoding phases.

Attribute tokenization module 304 may utilize external tokenization algorithms to enhance the security and efficiency of the tokenization process. For example, the module might employ algorithms like the Advanced Encryption Standard (AES) for its robustness and widespread acceptance in the industry. Additionally attribute tokenization module 304 could leverage the Format Preserving Encryption (FPE) algorithm, which is particularly useful for maintaining the original data format while ensuring the content remains encrypted and secure. In scenarios requiring such external algorithms, attribute tokenization module 304 establishes a secure connection to external libraries or services that specialize in cryptographic processes, thereby integrating advanced security measures without the need to develop proprietary encryption algorithms in-house.

Attribute tokenization module 304 obtains extracted attributes from document analysis module 310, applying tokenization algorithms to transform these attributes into tokens, and then forwarding the tokenized data to authentication encoding module 306 for further processing and secure storage or blockchain recording.

In certain embodiments, alternative tokenization methods might be employed, such as dynamic tokenization, which generates different tokens for the same piece of data each time it is processed, enhancing security. Another alternative is format-preserving tokenization, where the token retains the format of the original data, making it suitable for systems that require data to adhere to specific formats without revealing actual values.

In accordance with an example use, when processing a user's government-issued ID, the attribute tokenization module 304 receives extracted personal details such as the user's name and identification number. These details are then converted into tokens, which are used in subsequent verification processes or stored within the system's secure repositories. This tokenized information can be safely shared with service providers or other entities requiring verification of the user's identity, without exposing the actual data, thus maintaining the user's privacy and the integrity of their personal information.

Authentication encoding module 306 is operable to encode the verification results and tokenized attributes into a secure format, preparing them for secure storage or recording on a blockchain or other data store. Authentication encoding module 306 helps ensure the integrity and confidentiality of the data as it transitions through the verification process.

Authentication Encoding Module 306 can obtain data from preceding components such as the attribute tokenization module 304. The data may include, for example, tokenized attributes of user identities such as names, dates of birth, or biometric information, which have been converted into a format suitable for encryption and secure storage.

Technically, authentication encoding module 306 comprises encryption algorithms and security protocols designed to handle sensitive information. Generally, authentication encoding module 306 uses standardized cryptographic methods to convert tokenized data into encoded formats that are nearly impossible to reverse-engineer. More specifically, the module might utilize Advanced Encryption Standard (AES) or Secure Hash Algorithms (SHA) for encrypting data, ensuring that the information remains secure even if intercepted.

In one embodiment, authentication encoding module 306 is further designed to work in conjunction with the distributed ledger technology, such as blockchain, where encoded data is stored as transactions. This helps to ensure that once the data is recorded, it cannot be altered without consensus from the network, thereby maintaining the data's integrity and trustworthiness. For example, when user data is processed through the system, authentication encoding module 306 receives tokenized attributes from attribute tokenization module 304 or another appropriate component. Authentication encoding module 306 then encodes these attributes into a secure format using encryption algorithms. The encoded data is subsequently stored in the verified identity data store 332 or recorded on attribute token ledger 334, or otherwise processed, depending on the system configuration.

Another alternative includes using format-preserving encryption, which allows the data format to remain unchanged while the content is encrypted. This is particularly useful in systems where data format needs to be consistent for downstream processing or compliance reasons.

Through its interaction with other components, such as the communication interface 308 and the credential issuance module 314, authentication encoding module 306 facilitates a secure data flow across the system. For instance, once the data is securely encoded, it can be transmitted via the communication interface 308 to external systems or used by the credential issuance module 314 to generate digital credentials that represent the verified identity or attributes of the user.

In accordance with an example use, authentication encoding module 306 may encode a set of verification results that include a user's biometric data. The encoded results are then securely transmitted over the network to an external verification service, ensuring that the sensitive biometric information remains confidential throughout the transmission process.

Consent compliance module 312 is operable to ensure that user consent is accurately obtained, verified, and managed throughout the data processing and verification stages. Consent compliance module 312 aligns data handling practices with privacy regulations, safeguarding sensitive information and maintaining user trust.

In accordance with various embodiments, consent compliance module 312 collects consent data through explicit interactions with graphical user interfaces, where users can explicitly agree or disagree with data handling policies. Alternatively, consent may be gathered via API calls from partner platforms that have secured prior user approval.

The data managed by consent compliance module 312 may include, for example, user consent logs, preferences for data usage, and records of consent withdrawal.

In an embodiment, consent compliance module 312 comprises a processing unit designed to manage consent data effectively. Consent compliance module 312 can ensure that data processing within the system adheres to the consent provided by the users. Consent compliance module 312 can integrate with other system components, such as identity parsing component 202 and data normalization component 204, to ensure that data handling respects user preferences at every stage of the verification process.

In one embodiment, consent compliance module 312 is responsible for obtaining consent at the point of data entry. Consent compliance module 312 module records the consent in user consent log 222 or another appropriate data store, maintaining a comprehensive record of consent-related actions. As data flows through the system, consent compliance module 312 may verify that each data processing action aligns with the recorded consents, ensuring compliance with user directives and regulatory requirements.

In certain embodiments, consent compliance module 312 implements dynamic consent management, allowing users to adjust their consent preferences in real-time. For example, users can modify permissions for data usage, revoke consent, or provide new consents as necessary. An additional feature may include using blockchain technology to immutably record consent transactions, providing enhanced security and non-repudiation.

For instance, in scenarios involving sensitive data processing, consent compliance module 312 may work in conjunction with document analysis module 310 and authentication encoding module 306 to enforce consent policies across data transactions. This integration helps ensure that data is processed according to the consent provided by the user, thereby reinforcing the system's compliance with stringent data protection regulations.

Credential issuance module 314 is operable to issue digital credentials or tokens representing the verified identity or attributes of the user. Said differently, credential issuance module 314 formalizes the verification results into secure, portable formats.

In an embodiment, credential issuance module 314 can obtain verification results and user attributes from authentication encoding module 306, which provides encoded data ready for credentialing. Additionally, data can be sourced from verified identity data store 332, which houses approved and verified user information.

The data handled by credential issuance module 314 may include, for example, encoded user personal details, biometric identifiers, and digitally verified signatures.

Credential issuance module 314 comprises a series of cryptographic processes designed to securely transform verified identity attributes into digital credentials. These credentials are crafted to be tamper-evident and easily verifiable across different systems. More specifically, the module uses public key infrastructure (PKI) and blockchain technology to ensure the integrity and authenticity of issued credentials.

In an embodiment, when credential issuance module 314 receives encoded data from authentication encoding module 306, or another appropriate component, the module processes this data, applying additional security measures and converting it into a standardized credential format, such as digital tokens or certificates. In certain embodiments, credential issuance module 314 might use dynamic credentialing, which adjusts the details and security features of the credentials based on the specific requirements of the verification scenario. Another alternative involves the use of blockchain technology to issue credentials that are secure and decentralized.

In accordance with an example use, when a user passes verification checks, credential issuance module 314 retrieves the authenticated attributes from verified identity data store 332. It then generates a digital identity card that encapsulates the user's verified information in a tokenized format. This digital identity card can be used across various platforms to confirm the user's identity without revealing sensitive personal information, thus maintaining the user's privacy and the integrity of their personal information.

It should be noted that the various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Figure 4:
FIG. 4 an exemplary view of identity verification token system (IVTS) 143 in accordance with various embodiments.
Figure 4:
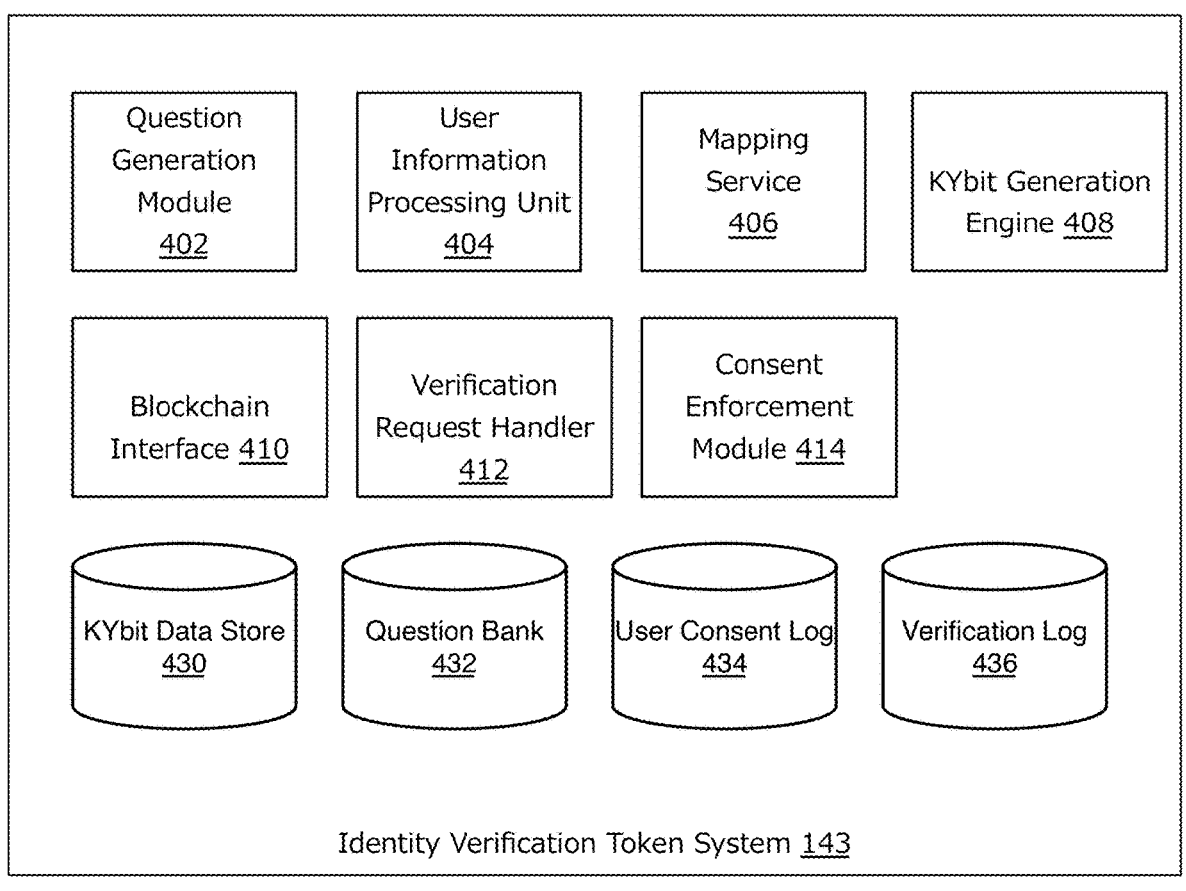

FIG. 4 an exemplary view 400 of identity verification token system (IVTS) 143, including subcomponents and their roles in the verification process through the creation, management, and validation of KYbits, in accordance with various embodiments. In this example, identity verification token system (IVTS) 143 includes question generation module 402, user information processing unit 404, mapping service 406, KYbit generation engine 408, blockchain interface 410, verification request handler 412, consent enforcement module 414, along with KYbit data store 430, question bank 432, user consent log 434, and verification log 436, streamlining the secure exchange of verification data while maintaining user privacy and data integrity.

Question generation module 402 is operable to generate verification questions based on specific business or service provider criteria. Generally, question generation module 402 comprises a processing unit capable of handling complex algorithms that generate targeted questions based on predefined criteria. More specifically, question generation module 402 utilizes a database of potential questions stored within question bank 432, selecting and customizing these questions based on the current verification requirements.

In one embodiment, question generation module 402 receives input parameters that dictate the type of verification required. These input parameters could include user demographic information, the type of service being accessed, legal requirements specific to the user's jurisdiction, or specific risk parameters defined by the service provider. For example, if a service provider needs to verify a user's age and residency, question generation module 402 retrieves relevant question templates from question bank 432 and adjusts them according to the specific data points that need verification.

Still, in other embodiments, question generation module 402 may incorporate artificial intelligence algorithms to improve the relevance and accuracy of the questions generated. This AI-driven approach allows for adaptive question generation that evolves based on feedback received from past verifications, enhancing the precision of the verification process over time. One example of such an algorithm is a neural network trained on historical verification data, which can dynamically adjust question parameters to optimize clarity and relevance in real-time scenarios.

Another alternative is employing machine learning models within question generation module 402 to predict the most effective questions based on historical data. This predictive model analyzes previous interactions and outcomes to refine question selection, ensuring that the most pertinent questions are posed—those that have historically resulted in the highest accuracy rates of user verification while requiring the least user input, thereby minimizing the burden on the user while maximizing data integrity and security.

In an embodiment, question generation module 402 interacts with user information processing unit 404 and mapping service 406 to generate questions that can be directly mapped to the corresponding user data verified. This integration helps to ensure that each verification process is both efficient and secure, minimizing potential errors and enhancing user experience. For example, question generation module 402 might generate questions for a financial service provider looking to authenticate the identity and creditworthiness of a new applicant. In this scenario, the module selects questions that align with financial regulatory requirements and the specific risk profile of the service being offered. Similarly, in a healthcare setting, question generation module 402 could tailor questions to confirm a patient's eligibility and medical history without compromising sensitive personal information, adhering to HIPAA regulations.

Accordingly, in accordance with various embodiments, question generation module 402 facilitates the creation of context-specific verification questions and enhances the overall security and efficiency of the identity verification process. By dynamically generating and adapting questions to fit specific verification contexts, question generation module 402 maintains the integrity and privacy of the verification process across various sectors.

User information processing unit 404 is operable to prepare the user's identity data for analysis and mapping against generated questions. More specifically, it includes various processing methods to parse and organize incoming data into a structured format suitable for further processing. For example, user information processing unit 404 may receive raw data inputs from online forms, API feeds, or direct user interactions and employ algorithms to extract relevant identity elements.

In one embodiment, user information processing unit 404 uses data parsing algorithms combined with validation routines to ensure the accuracy and integrity of processed data. This includes verifying data against known patterns or standards, such as validating formats of telephone numbers or postal codes. For instance, it may employ regular expressions to match and validate the format of input data against predefined patterns, ensuring that telephone numbers conform to international standards before they are processed further.

User information processing unit 404 interacts with question generation module 402 and mapping service 406 to dynamically generate verification questions based on processed data. This ensures each verification process is tailored to the specific needs of the user and service provider. For example, once the user's age and residency data are validated and formatted, this unit may trigger question generation module 402 to create custom questions that confirm these attributes without exposing other personal details.

Additionally, user information processing unit 404 incorporates machine learning models to enhance data processing capabilities. These models adapt based on trends observed in user data submissions, which allows for improved categorization and extraction of data over time. For example, a machine learning model may learn to identify and categorize new data formats based on their frequency and user feedback, automatically updating its processing algorithms to accommodate these formats without human intervention. Another method employed is the use of natural language processing (NLP) techniques to process unstructured data inputs effectively. This allows the unit to parse free-text fields in user inputs, extracting key identity verification details embedded in natural language. For instance, NLP techniques can identify and extract date of birth or address information from a user's descriptive input in a customer support chat.

In an embodiment, user information processing unit 404 helps to ensure that data used for generating KYbits is accurate and up-to-date through interactions with blockchain interface 410 and KYbit generation engine 408. User information processing unit 404 participates in data validation and synchronization processes, confirming that verified and current data is used in the KYbit generation process. For example, it verifies that user data matches the latest blockchain records before KYbits are generated, thus maintaining data integrity and security.

In an illustrative use case, when a user submits a document through an online verification portal, user information processing unit 404 first parses the document to extract information. Documents can include, for example, government-issued identification such as passports or driver's licenses, educational certificates, and employment records. User information can include, for example, name, date of birth, address details, and biometric data such as fingerprints or facial recognition data. User information processing unit 404 standardizes this information. For example, in an embodiment, user information processing unit 404 standardizes this information according to predefined schemas before submitting it to mapping service 406, which uses the standardized data to generate relevant verification questions, thus ensuring that the verification process is both efficient and compliant with data protection regulations.

Mapping service 406 is operable to correlate verification questions generated by question generation module 402 with corresponding user data processed by user information processing unit 404. Verification questions can include, for example, "What is your date of birth?", "In which city were you born?", "What is your mother's maiden name?", or "What was the make and model of your first car?" It should be noted that verification questions can be any question used to verify identity by matching the answers provided by the user against the stored data in the system.

In an embodiment, mapping service 406 can utilize a structured algorithmic framework to map user responses to the appropriate verification criteria, enhancing the accuracy of the identity verification process. For example, the framework may employ a decision tree algorithm that takes user responses as input and matches them against a set of predefined verification criteria stored in a database. This process involves multiple steps, such as normalizing the user input data to ensure consistent formatting and then comparing this normalized data against the expected responses using a series of conditional checks.

For instance, if the question is "What is your date of birth?" and the user's response is "March 10, 1990," the algorithm will first convert this response into a standardized date format, such as "1990-03-10." The decision tree will then traverse through its nodes to check if the date matches the date of birth stored in the user's profile. The framework may also include error-checking mechanisms to account for common discrepancies, such as differences in date formatting or typographical errors, thereby enhancing the robustness and reliability of the verification process.

Additionally, the algorithm can handle compound questions that require multiple pieces of information, such as "What is your full name and date of birth?" In this case, the framework splits the response into distinct data elements (e.g., full name and date of birth), processes each element independently, and verifies them against the corresponding criteria.

In one embodiment, mapping service 406 comprises a data integration engine that retrieves structured user data from user information processing unit 404. The service applies predefined mapping rules to this data to generate a set of responses corresponding to the verification questions posed. For example, when user information processing unit 404 provides structured data such as date of birth, address, and other identification details, mapping service 406 utilizes a set of mapping rules defined in its rule repository. These rules specify the criteria for matching the structured data to appropriate verification questions.

In an example use, if the service provider requires verification of the user's residential address, mapping service 406 pulls the standardized address data from user information processing unit 404. The service then applies rules that check for consistency between the provided address and known address formats or match the address against a list of valid regions provided by the service provider. If the user's address matches the expected format and is found in the valid regions list, mapping service 406 generates a response indicating successful address verification.

In an embodiment, mapping service 406 employs machine learning techniques to refine its mapping algorithms over time. For instance, mapping service 406 uses supervised learning models to analyze historical data, including user responses and verification outcomes. This analysis allows mapping service 406 to identify patterns that correlate with successful verification. For example, the mapping service 406 could utilize a decision tree classifier, a type of machine learning model, which learns from labeled training data that includes past user responses and the corresponding verification results. The decision tree identifies key features and decision points that have historically led to accurate verifications. For instance, if the data indicates that verifying specific document attributes (like a watermark or specific layout elements) tends to result in higher verification success rates, the model adjusts to prioritize these attributes in future mappings. Over time, as more data is processed, mapping service 406 continuously updates its models, integrating new insights to improve relevance and accuracy. This dynamic adjustment helps to ensure that the service adapts to evolving verification criteria and user behavior patterns, enhancing the system's efficiency and reliability in verifying identities. In certain embodiments, mapping service 406 utilizes feedback loops to correct and optimize its mappings, further refining the algorithms to achieve better verification outcomes.

In accordance with various embodiments, mapping service 406 interacts with blockchain interface 410 and KYbit generation engine 408. For example, mapping service 406 receives the structured responses generated from the user data and verification questions and then communicates these responses to blockchain interface 410. Blockchain interface 410 subsequently records these responses within the attribute token ledger 334, ensuring that each response is securely stored on the blockchain. This integration with KYbit generation engine 408 allows for the conversion of these responses into KYbits, which are securely stored and managed. This process ensures a seamless flow of verified data across the system, enhancing the overall security and reliability of the identity verification process by maintaining a tamper-proof record of verification activities. In accordance with an example use, mapping service 406 might receive a query from a financial service provider to verify a user's employment status. In this scenario, Mapping Service 406 retrieves the user's employment data from the processed inputs, maps this data against the verification questions related to employment, and generates a tokenized confirmation of employment status that meets the provider's specific verification criteria.

KYbit generation engine 408 secures the tokenized data by generating a private key for each user, which is used to encrypt the KYbits before they are stored on the blockchain. This private key is utilized in decrypting the KYbits when they are retrieved from the attribute token ledger, ensuring that authorized parties can access the sensitive identity information.

In the process, KYbit generation engine 408 receives these verified responses and applies cryptographic techniques to transform them into KYbits. This transformation involves encrypting the verified identity elements to ensure they are anonymized, meaning the resulting KYbits do not reveal any personal information about the user. The secure nature of these tokens helps to ensure that while they contain the necessary information for identity verification, they do so without exposing the user's raw data, thereby preserving privacy and enhancing data security.

KYbit generation engine 408 is operable to transform verified responses from the mapping service 406 into KYbits, which are secure, anonymized tokens representing the verified identity elements. More specifically, KYbit generation engine 408 receives the processed and validated data and applies a hashing algorithm or similar cryptographic process to convert this data into KYbits. These KYbits are then used as secure representations of the user's verified identity information.

Verification responses can include, for example, confirmation of a user's address from a utility bill, or validation of a user's age based on a government-issued ID. The responses are verified by cross-referencing with trusted external databases or utilizing built-in validation algorithms to ensure the data's accuracy and authenticity.

KYbit generation engine 408 secures the tokenized data by generating a private key for each user, which is used to encrypt the KYbits before they are stored on the blockchain. This private key is utilized in decrypting the KYbits when they are retrieved from the attribute token ledger, ensuring that authorized parties can access the sensitive identity information. In accordance with an embodiment, KYbit generation engine 408 interacts with mapping service 406 and blockchain interface 410. For example, KYbit generation engine 408 retrieves mapped responses from mapping service 406 and utilizes cryptographic algorithms to generate KYbits. These KYbits are then forwarded to blockchain interface 410, which records them in the attribute token ledger 334. This process helps to ensure that the KYbits are securely stored and immutable, providing a reliable and tamper-resistant record of the verification process.

The KYbit generation engine 408 employs cryptographic algorithms such as SHA-256 (Secure Hash Algorithm 256-bit) to create a unique hash of the mapped responses. The mapped response might include data like a user's confirmed address or verified age. The cryptographic algorithm processes this input data to generate a fixed-size string of characters, typically a 64-character hexadecimal number, known as a KYbit. This hash is a unique digital fingerprint of the original data, ensuring that any change in the input would result in a significantly different hash, thereby detecting tampering. For added security, a process called "salting" may be applied, where a random value is added to the input data before hashing, making it more resistant to certain types of attacks.

Alternatively, the system can use other cryptographic methods such as Keyed-Hash Message Authentication Code (HMAC), which involves both a cryptographic hash function and a secret cryptographic key, or Hash-Based Message Authentication Code (HMAC), which ensures message integrity and authenticity. Additionally, digital signature algorithms may be employed to provide a secure, non-repudiable proof of the data's origin and integrity. The resulting KYbit is then encrypted using a public key infrastructure (PKI) system before being forwarded to blockchain interface 410. The blockchain interface records the encrypted KYbit in the attribute token ledger 334, ensuring the data's immutability and security through the decentralized nature of blockchain technology. This setup prevents unauthorized alterations and provides a verifiable chain of custody for each KYbit generated.

In an embodiment, the KYbit generation engine 408 supports transforming verification pairs into corresponding binary representations through the use of a one-way function. This one-way function could be a cryptographic hash function, such as SHA-256, which generates a fixed-size hash value from the input data. Alternatively, the engine can utilize other cryptographic methods, such as Keyed-Hash Message Authentication Code (HMAC) or digital signature algorithms, to ensure the resulting binary representations are secure and computationally infeasible to reverse-engineer.

In an embodiment, the KYbit generation engine 408 may employ various cryptographic methods for creating secure binary representations of the verification pairs. These methods include but are not limited to cryptographic hash functions (e.g., SHA-256), keyed-hash message authentication codes (HMAC), and digital signature algorithms. Each method provides a different level of security and data integrity, ensuring that the transformed verification pairs remain secure and private.

In another embodiment, KYbit generation engine 408 may implement additional security measures such as encryption or digital signatures to further protect the integrity and confidentiality of the KYbits. For instance, each KYbit can be encrypted with a unique key before being stored on the blockchain, ensuring that authorized parties can access the underlying data.

Accordingly, KYbit generation engine 408 helps to ensure that the tokenized data remains decoupled from the user's actual identity, thereby enhancing privacy and compliance with data protection regulations. In accordance with an example use, KYbit generation engine 408 receives a verified response indicating a user's residency status from mapping service 406. The engine then applies a hashing algorithm to create a KYbit that represents this verified status. This KYbit is then encrypted and recorded on the blockchain through blockchain interface 410. Authorized service providers with the appropriate decryption key can access the actual residency information, ensuring both security and privacy.

Blockchain interface 410 is operable to facilitate the recording of KYbits onto a distributed ledger, ensuring their integrity and immutability. Generally, blockchain interface 410 serves as the communication gateway between the KYbit generation engine 408 and the blockchain network. More specifically, blockchain interface 410 is responsible for securely transmitting KYbits, which are cryptographic tokens representing verified identity elements, to the blockchain for permanent and tamper-resistant storage.

In accordance with various embodiments, upon receiving KYbits from the KYbit generation engine 408, blockchain interface 410 encapsulates them in a secure transaction format suitable for blockchain recording. In an embodiment, this encapsulation process involves multiple technical steps to ensure that the KYbits are properly structured for the blockchain. For example, blockchain interface 410 may first format the KYbits data into a blockchain-compatible structure, such as a block header and block body format, where the header contains metadata including timestamps, block height, and a hash of the previous block. The block body contains the actual KYbits data along with associated digital signatures for authentication.

Specifically, the digital signature is generated using a private key corresponding to a public key that can be used by other entities to verify the authenticity and integrity of the data. The metadata might also include a Merkle tree structure, which allows for efficient and secure verification of the KYbits data's integrity. This tree structure summarizes the transactions in a block and provides a single hash value, the Merkle root, that represents the entire data set, enabling quick and tamper-proof validation of the data.

For example, if a KYbit represents a verified user address, the blockchain interface 410 would include this data within the block body and attach a digital signature generated by hashing the KYbit data along with a private key. This helps to ensure that any attempt to alter the data after it has been recorded on the blockchain can be detected, as the altered data would not match the hash stored in the block header. Thus, encapsulating KYbits in this secure transaction format ensures their integrity, immutability, and authenticity within the blockchain, providing a reliable record of verified identity elements.

Blockchain interface 410 comprises components that manage the transaction submission process, including creating a unique transaction ID and timestamp. This metadata ensures traceability and accountability within the blockchain, providing a transparent audit trail for recorded KYbits. Additionally, blockchain interface 410 incorporates cryptographic techniques, such as hashing and digital signatures, to authenticate and secure the transaction data before it is broadcast to the blockchain network.

In another embodiment, blockchain interface 410 utilizes a consensus mechanism to confirm the integrity of the transaction before it is added to the blockchain. For instance, the interface may work with a proof-of-stake (PoS) or proof-of-work (PoW) consensus algorithm, depending on the specific blockchain network being used. This mechanism involves validating the transaction through network nodes, which helps to ensure that legitimate and accurate KYbits are recorded on the distributed ledger.

For example, if blockchain interface 410 uses a PoS mechanism, it would involve selecting validators based on their stake in the network. These validators then confirm the transaction's authenticity and add it to the blockchain. In another scenario, if using a PoW mechanism, the transaction would be confirmed through computational effort by miners, ensuring that the data is securely appended to the blockchain.

In further embodiments, blockchain interface 410 may implement additional security measures, such as encryption of KYbit data before transmission to the blockchain. This helps to ensure that even if the data were intercepted, it would remain unreadable without the appropriate decryption key. Furthermore, the interface may support smart contract functionality, allowing automated execution of conditions based on the state of the blockchain, such as automatically releasing KYbits to authorized entities under predefined conditions.

In accordance with an example use, when a user completes a verification process, blockchain interface 410 receives the KYbits generated for the user's verified attributes. The interface then packages these KYbits into a blockchain transaction, signs it with a digital signature, and submits it to the blockchain network. The transaction is then verified by the network's nodes, and once confirmed, the KYbits are immutably recorded in the attribute token ledger 334. This ensures a secure, tamper-proof record of the verification process that can be reliably referenced in future verifications or audits.

Verification request handler 412 is operable to manage and route incoming verification requests from service providers through the system. In accordance with various embodiments, verification request handler 412 serves as the initial point of contact for service providers seeking to verify specific identity elements of users. Generally, verification request handler 412 is responsible for receiving these requests, validating their format and content, and ensuring that they comply with the system's protocols before proceeding with further processing.

More specifically, verification request handler 412 comprises a request intake module and a validation engine. The request intake module is configured to receive verification requests via multiple communication channels, such as RESTful APIs, secure file transfers, or web-based forms. Upon receiving a request, the request intake module parses the incoming data to extract relevant details, such as the identity elements to be verified, the required verification criteria, and any specific instructions provided by the service provider.

The validation engine within verification request handler 412 then performs a series of checks to ensure that the request is complete and correctly formatted. For example, the validation engine may verify that required fields are present, that the data types of the provided information match the expected formats, and that the request includes valid authentication tokens or digital signatures to confirm the identity of the requesting service provider.

In this manner, verification request handler 412 also interacts with consent enforcement module 414 to ensure that the necessary user consents have been obtained for the requested verifications. This interaction is critical for maintaining compliance with data protection regulations, as it verifies that the user has authorized the processing and sharing of their data for the specific purposes outlined in the request.

In one embodiment, verification request handler 412 utilizes a dynamic routing system that directs the request to the appropriate components within the identity verification token system (IVTS) 143 based on the type of verification required. For example, if a request involves verifying a user's residential address, the handler routes the request to components like the document verification module and mapping service, which are responsible for validating and processing address-related data.

In another embodiment, verification request handler 412 includes a priority management feature that prioritizes requests based on predefined criteria, such as the urgency of the verification, the type of service being accessed, or the risk level associated with the request. This helps to ensure that high-priority verifications, such as those required for financial transactions or emergency services, are processed promptly and efficiently.

For example, in a financial services scenario, a bank might submit a verification request to confirm a user's identity and creditworthiness. Verification request handler 412 would receive this request, validate its completeness and authenticity, and ensure that appropriate user consent has been obtained. The handler would then route the request to the relevant verification components, such as the document analysis module and KYbit generation engine, ensuring a secure and compliant verification process.

Similarly, in a healthcare setting, a hospital might request verification of a patient's insurance details and eligibility for treatment. Verification request handler 412 would handle this request by validating the information, checking for user consent, and directing the request through the necessary verification channels, thus facilitating a secure and efficient verification process that complies with healthcare regulations.

In accordance with various embodiments, verification request handler 412 manages and routes verification requests and in certain embodiments maintains a record of transactions. This record-keeping function can be used for audit purposes, providing a log of the verification requests processed, the actions taken, and the outcomes achieved. These records can be stored in the verification log 436, ensuring that the entire verification process is transparent and accountable.

In an embodiment, the verification system 146 interfaces with the data repository that stores binary representations of the verification pairs. Upon receiving a verification request, the system retrieves the relevant binary representations and compares them to the specified attributes. The system then generates a verification result, indicating whether the retrieved binary representations match the specified attributes, without exposing the user's raw data.

Consent enforcement module 414 is operable to verify and enforce user consent for data processing and sharing activities. Consent enforcement module 414 helps to ensure that operations comply with the consent provided by users, maintaining adherence to data privacy regulations. Generally, consent enforcement module 414 acts as a gatekeeper, confirming that data usage aligns with user permissions and legal requirements.

In one embodiment, consent enforcement module 414 interacts with user consent log 434 to access and verify historical consent records. For example, when a service provider requests verification, the module checks the user consent log to confirm that the user has authorized the sharing of specific KYbits with the requesting entity. This involves cross-referencing the user's consent against the parameters of the request, such as the type of data being accessed, the requesting party, and the intended use of the data.

In another embodiment, consent enforcement module 414 supports dynamic consent management, allowing users to modify their consent preferences in real-time. For instance, users can change their consent settings to allow or restrict the sharing of certain identity elements. This system supports both explicit consent, where users actively agree to specific actions, and implicit consent, such as when certain actions (e.g., entering a venue) imply consent for limited data use like verifying age.

To comply with privacy laws and regulations, consent enforcement module 414 may implement additional measures such as granular consent controls, enabling users to specify which KYbits they agree to share under different circumstances. For example, a user might consent to share their age verification KYbit with a retailer but opt-out of sharing their address verification KYbit. Furthermore, the module maintains audit logs, recording consent-related actions, including timestamps, specific consent details, and the involved parties. These logs are securely stored and can be accessed for compliance audits to demonstrate adherence to data protection regulations.

In various embodiments, consent enforcement module 414 verifies the presence of consent and assesses its scope and relevance. For instance, if a bank requests a user's income verification, the module checks whether the user's consent includes this specific type of data. If not, the module may prompt the user to update their consent settings. In some cases, users may give consent immediately if they have the necessary KYbit, or they may be prompted to create a KYbit if one is not available. This helps to ensure that data sharing is always in line with the user's consent and preferences, thereby safeguarding user autonomy and data privacy.

KYbit data store 430 is operable to store the generated KYbits, which represent tokenized pieces of identity information. Generally, KYbit data store 430 functions as a secure repository for these anonymized tokens, ensuring their integrity and accessibility for future verification processes. More specifically, KYbit data store 430 is designed to handle the storage and retrieval of KYbits, maintaining the confidentiality and security of the stored information.

In accordance with various embodiments, KYbits are generated by KYbit generation engine 408, which transforms verified user data into secure tokens. Once generated, these KYbits are transmitted to KYbit data store 430 for storage. For example, after verifying a user's address and generating a corresponding KYbit, the KYbit generation engine 408 sends this token to KYbit data store 430, where it is securely stored along with metadata such as timestamps and cryptographic signatures.

KYbits are primarily used by other components within the identity verification system. For instance, when a service provider requests verification of specific user attributes, blockchain interface 410 retrieves the relevant KYbits from KYbit data store 430 and uses them to validate the requested information. This helps to ensure that the verification process is both efficient and secure, leveraging the stored KYbits to provide quick and reliable identity confirmations.

Question bank 432 is operable to serve as a repository of pre-defined verification questions that can be dynamically selected based on the verification needs. Generally, question bank 432 contains a comprehensive collection of questions designed to authenticate various aspects of user identity. More specifically, question bank 432 is structured to categorize questions by the type of verification required, such as age, residency, or employment status.

In one embodiment, question generation module 402 accesses question bank 432 to retrieve appropriate questions based on the input parameters specified by the service provider. For example, if a service provider needs to verify a user's age, question generation module 402 may select questions from question bank 432 that are specifically tailored to age verification, such as "What is your date of birth?" or "In which year did you graduate high school?"

Question bank 432 is dynamically updated to include new questions and remove outdated ones, ensuring that the repository remains relevant and effective for various verification scenarios.

User consent log 434 is operable to store user consent actions, ensuring that data processing and sharing comply with privacy regulations. Generally, user consent log 434 functions as a secure and auditable repository for consent-related activities. More specifically, user consent log 434 records detailed information about each consent action, including timestamps, the scope of consent provided, and the entities involved.

In accordance with various embodiments, consent collection component 210 and consent compliance module 312 interact with user consent log 434 to verify and record user consent. For example, when a user consents to share their KYbits with a financial institution, consent collection component 210 records this action in user consent log 434, including details about the specific KYbits authorized for sharing and the conditions under which they can be used.

User consent log 434 is used by other components within the system to ensure compliance with privacy regulations. For instance, before processing a verification request, consent enforcement module 414 checks user consent log 434 to confirm that the necessary consent has been obtained.

Verification log 436 is operable to store logs of verification requests and outcomes, providing an audit trail for compliance and review. Generally, verification log 436 functions as a record of verification activities within the system, including the use of private keys for accessing identity tokens on the blockchain. More specifically, verification log 436 captures detailed information about each verification request, including the requestor, the attributes verified, the outcomes, and any anomalies detected during the process. In an embodiment, verification request handler 412 records each incoming verification request in verification log 436, including metadata such as timestamps and request identifiers. For example, when a service provider submits a request to verify a user's employment status, verification request handler 412 logs this request in verification log 436 along with details about the verification process and the final outcome.

Computer Implemented Process

Figure 5:
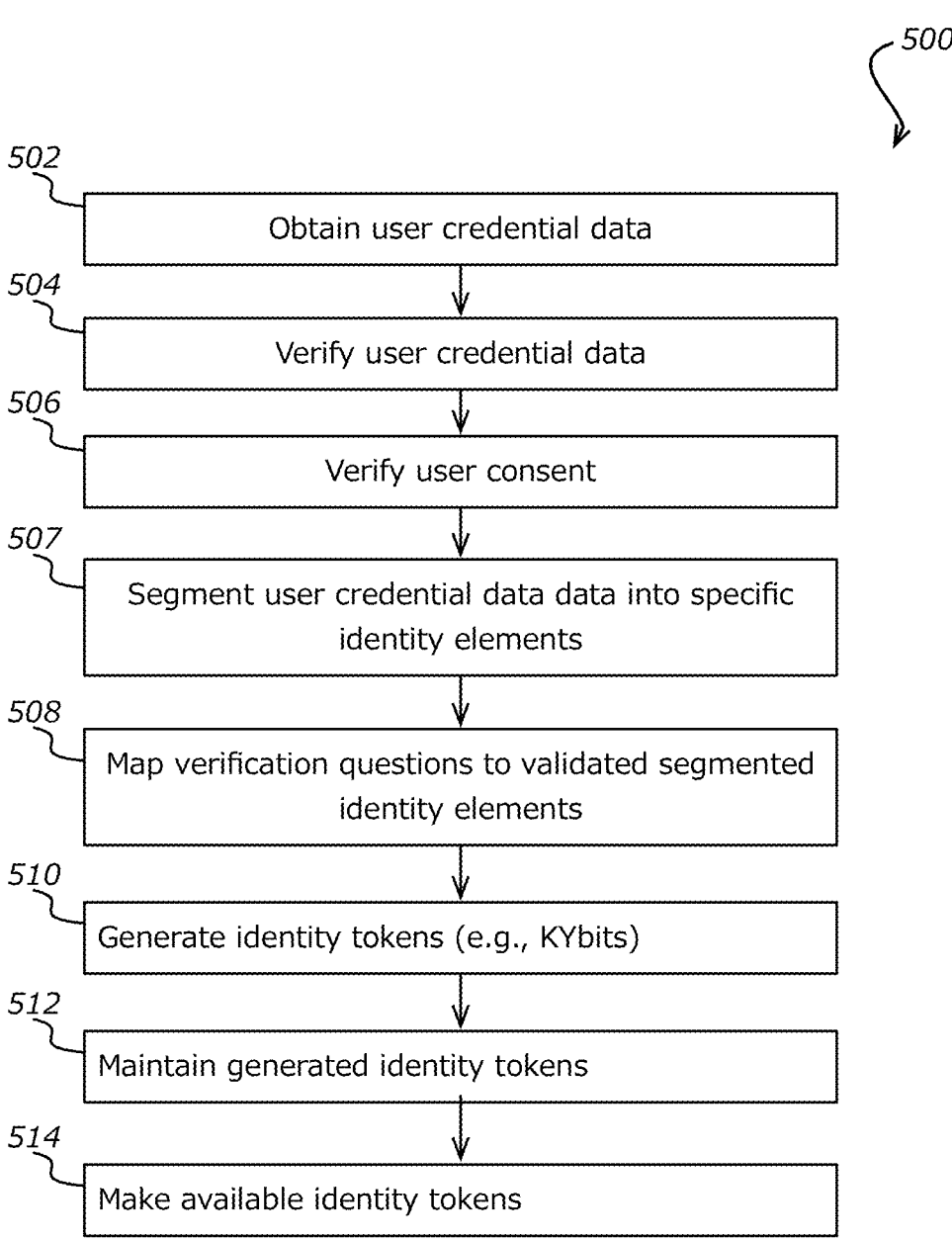
FIG. 5 is an example process for generating identity tokens in accordance with various embodiments.

FIG. 5 illustrates an example process 500 for generating identity tokens in accordance with various embodiments. It should be understood that, for any process discussed herein, there can be additional, fewer, or alternative steps, per-formed in similar or different orders, or in parallel, within the scope of the various embodiments unless otherwise stated.

In this example, user credential data is obtained 502. In an embodiment, user credential data can be provided from direct user input, databases, documents, papers, records, and the like. APIs can be used to obtain this data. For example, user information may come from scanned documents such as passports, driver's licenses, and utility bills, online forms filled out by the user, or disparate databases containing previous verification records. Some documents, like government-issued IDs, might be previously verified, while others, like utility bills, require verification. This data comprises identity attributes such as name, date of birth, address, and other identifiers necessary for the verification process. This credential data can be unstructured and originates from heterogeneous sources.

User credential data verified 504. In an embodiment, verifying user credential data includes parsing and validating the data against, e.g., a document verification authority or other such entity. For example, in an embodiment, the user information processing unit 404 or other appropriate component extracts relevant identity elements and verifies their accuracy by cross-referencing with authoritative sources, such as government records or trusted databases. The extraction is accomplished using techniques such as optical character recognition (OCR) for documents, API data pulls for digital records, and user input parsing for direct entries. Once extracted, the data is structured into a standardized format suitable for further processing. For example, a date of birth extracted from various sources is standardized to the format YYYY-MM-DD and verified against a national registry to ensure its accuracy.

User consent is verified and managed 506. In an embodiment, the consent enforcement module 414 or other appropriate component checks the user consent log 434 or other appropriate database to confirm that the user has authorized the use and sharing of their data. If the required consent is not present or insufficient, the system prompts the user for explicit consent, ensuring that data processing complies with privacy regulations and user preferences.

Segment user credential data into identity elements 507. In an embodiment, the system segments the user credential data into discrete identity elements, each representing a specific attribute of the user's identity, such as name, date of birth, or address. In an embodiment, the discrete identity elements can be standardized according to predefined formatting rules, such as normalizing date formats to YYYY-MM-DD and addresses to a standard layout.

Verification questions are mapped 508 to the validated segmented identity elements. In certain embodiments, the questions are dynamically generated. In various embodiments, verification questions may have already been generated based on pre-defined criteria. In an embodiment, the question generation module 402 creates tailored verification questions based on the specific requirements of service providers. For example, questions can include, "What is your date of birth?", "In which city were you born?", or "What was the make and model of your first car?" These questions are dynamically mapped to the validated user data by the mapping service 406.

In an embodiment, mapping comprises using algorithms that match the structured data with relevant question templates, ensuring that the identity tokens generated are relevant and specific to the verification queries. For example, the same piece of verified data, such as a date of birth, can be mapped to multiple questions depending on the context of the verification. In some embodiments, instead of, or along with mapping verification questions to the validated user data, identity tokens are mapped to the verification questions. For example, a hashing technique or encrypted IDs can be used to map identity tokens to verification questions, ensuring privacy.

Identity tokens are generated 510. In an embodiment, the KYBIT generation engine 408 tokenizes the verified responses into secure, anonymized identity tokens, also known as KYbits. KYbits are a form of binary-answerable, securely signed data elements tailored for privacy-preserving data exchange. In an embodiment, this can involve applying cryptographic techniques, such as hashing and encryption, to protect the integrity and confidentiality of the data. Each identity token encapsulates a specific piece of verified identity information, enabling discrete and controlled data sharing. The identity token, i.e., KYbit, can be associated with one or more questions. For example, if the question is "Are you over 21?" the KYbit encoded for the user's age, which is 21 or over, would provide a "yes" response to the requesting entity without sharing the actual age or birthdate of the user. This helps to ensure that the user's information was previously verified from authentic sources without disclosing unnecessary details. For instance, an identity token might be associated with both "Is the user over 21?" and "Is the user old enough to vote?" providing relevant answers without exposing detailed personal information.

In certain embodiments, the identity tokens are encoded with cryptographic authentication information. In this example, the system secures the generated identity tokens (KYbits) by attaching or embedding cryptographic authentication details to each token. This process involves generating digital signatures: Utilizing the system's private key to generate digital signatures for each identity token. These signatures serve as a cryptographic seal, verifying the origin and integrity of the token. Applying encryption: In some implementations, identity tokens may also be encrypted to protect the token's contents, ensuring that authorized entities with the corresponding decryption key can access the information. Associating tokens with authentication metadata: This includes appending metadata such as the issuing authority's identifier, timestamp of issuance, and any relevant cryptographic hashes that further establish the token's authenticity and validity period.

Generated identity tokens are maintained 512. In various embodiments, this includes maintaining the identity tokens on a blockchain. In an embodiment, the blockchain interface structures the tokens into a blockchain-compatible format, including metadata and digital signatures for authentication. For example, the tokens are then recorded in the attribute token ledger within the distributed ledger, ensuring their immutability and integrity. In various embodiments, this includes maintaining the identity tokens on a computerized ledger system, which can include a variety of ledger types such as decentralized blockchain, centralized databases, or hybrid systems.

Identity tokens are made 514 available for verification. In an embodiment, once stored on the blockchain, the identity tokens become available for use in verification processes and other applications. Service providers can query the system to confirm specific identity attributes without accessing the user's raw data, ensuring privacy and data minimization. For example, a service provider may query whether a user is over 21 without needing to know the user's exact age, thus maintaining privacy while satisfying the verification requirement.

Thereafter, compliance and audit logging can be maintained. In an embodiment, logs of actions can be maintained in the verification log, providing an audit trail to ensure transparency and accountability. The system continuously monitors for compliance with data protection regulations, updating any changes in user consent or verification criteria promptly.

Figure 6:
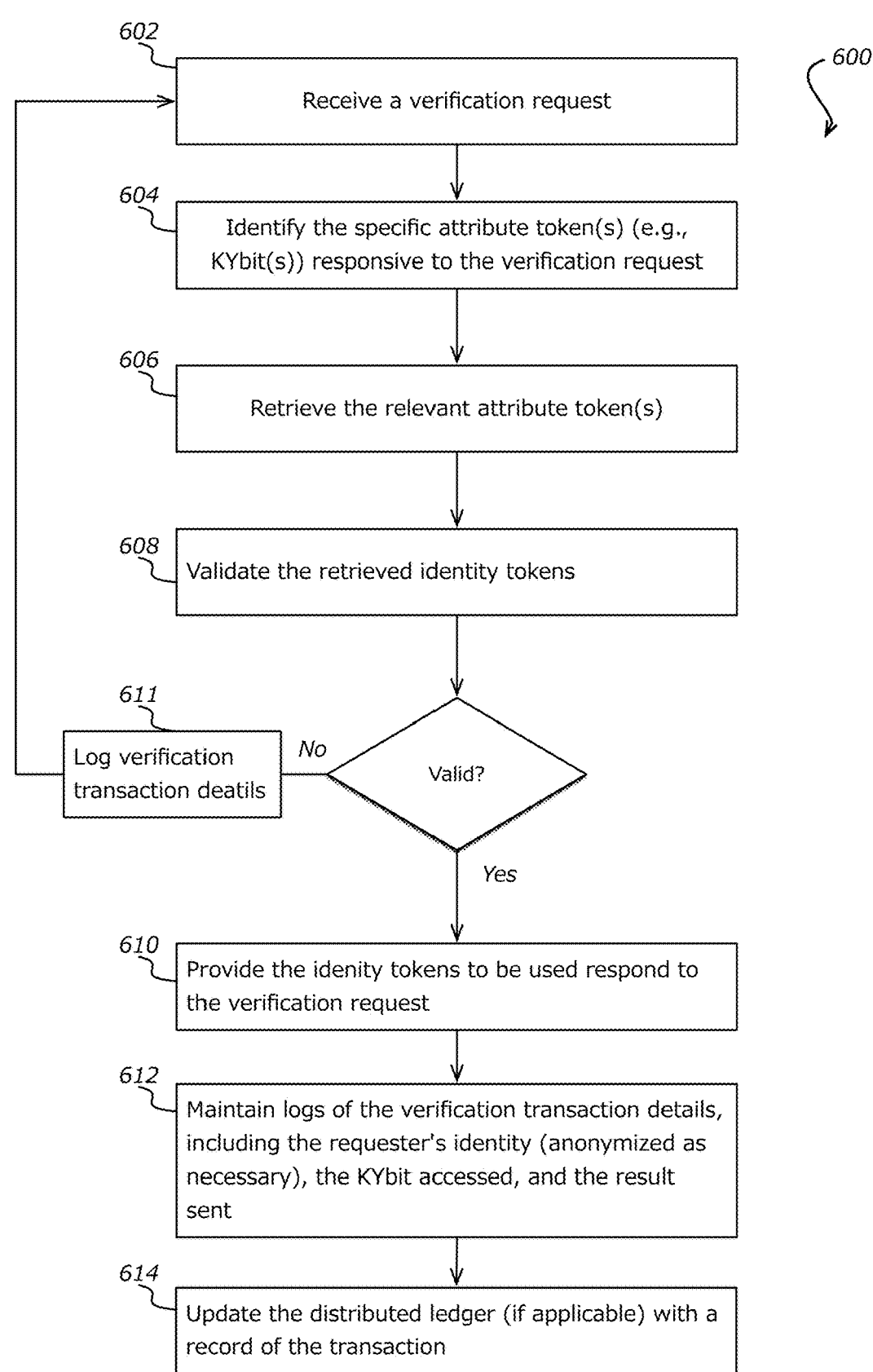
FIG. 6 is an example process for utilizing identity tokens (KYbits) within an identity verification system in accordance with various embodiments.

FIG. 6 illustrates an example process 600 for utilizing identity tokens (KYbits) within an identity verification system in accordance with various embodiments.

In this example, a verification request is received 602 from a service provider. The service provider seeks to verify specific identity attributes of a user to grant access to services or fulfill certain requirements. For example, the request can be received from a verification requester's device, such as a barcode or QR reader, Bluetooth device, NFC device, etc. A user might encounter a verification requester's device upon entering a store, where they have a card, such as an identity card, with a QR or barcode, or a user device that can transmit or otherwise provide information granting access to specific attribute tokens. This request is received by a verification request handler, which manages and routes the request through the system. In certain embodiments, the verification request handler or other appropriate component checks the user consent log to verify that the user has provided consent for the requested data sharing. This step ensures compliance with privacy regulations and user preferences. If the required consent is not found or is insufficient, the system may prompt the user to update their consent preferences.

Once user consent is confirmed, the specific attribute token(s) (e.g., KYbit(s) or identity token(s)) responsive to the verification request is identified 604. For example, the system may use a hashing technique to match the verification request with the corresponding attribute tokens stored in the system, ensuring that the relevant tokens are accessed and processed. Alternatively, the system may employ an encrypted identifier that directly correlates the verification request with the appropriate tokens, thereby maintaining the privacy and security of the user's data.

The relevant attribute token(s) are retrieved 606 from the attribute token ledger that matches the verification request. In an embodiment, retrieving attribute tokens includes using the user's private key to access and decode the stored information on the blockchain. This process involves querying the attribute token ledger with specific parameters derived from the verification request. The system locates the precise tokens that contain the verified identity information necessary for fulfilling the request. These attribute tokens have been previously generated and stored securely on the blockchain, each representing a specific piece of verified identity information. The use of the private key helps to ensure that authorized parties can access and decode the sensitive information, maintaining the privacy and security of the user's data.

The retrieved identity tokens are validated 608 by cross-referencing, e.g., a blockchain ledger, to ensure their integrity and authenticity. This may include checking the digital signatures and metadata associated with each token to confirm that they have not been tampered with and are indeed issued by the trusted system.

In the situation the retrieved identity tokens are validated, the identity tokens can provided 610 to be used to respond to the verification request. For example, if the service provider queried whether the user is over 21, the system utilizes the relevant identity token to provide a binary answer ("yes" or "no") without disclosing the user's actual age or birthdate. This helps to ensure that the necessary information is shared, preserving user privacy. In some embodiments, the service provider receives the verification response and grants access to the requested services based on the verified information. This process securely verifies the user's identity while minimizing the exposure of personal data. In an embodiment, the system provides the outcome of the verification process with the requesting service providers by sending a response that may include specific attribute tokens (KYbits). These tokens prove certain attributes of the user's identity (e.g., age or residency) without revealing any additional personal information. The communication is secured, ensuring that authorized service providers can receive and understand the verification results. In some embodiments, the system itself makes the decision based on the validated identity tokens and provides the decision (e.g., access granted or denied) directly to the service provider. In other cases, a combination of both approaches is used, where the system provides both the validated tokens and a recommendation or decision, allowing the service provider to make the final determination based on the provided information.

If access is not granted, the system logs 611 the reason for denial, ensuring transparency and accountability, and process the next verification request.

Throughout this process, logs of the verification transaction details can be maintained 612. The logs can be maintained in a verification log. These logs include timestamps, specifics of the consent provided, the identity tokens used, results provided and the entities involved. This audit trail ensures transparency and accountability, allowing for compliance with data protection regulations and facilitating audits if necessary. These logs can be maintained on the ledger or another ledger, such as a verification ledger. This might include, for example, updating 614 the distributed ledger (if applicable) with a record of the transaction to ensure an immutable history of the verification event.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 7:
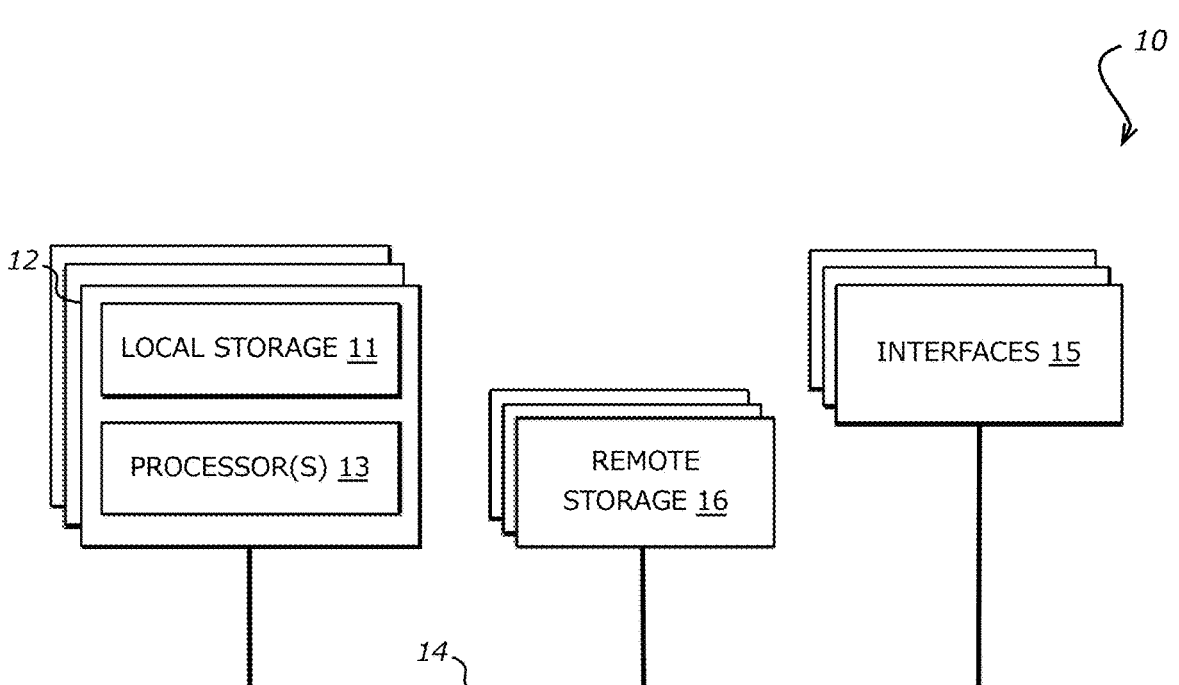
FIG. 7 illustrates components of a computing device that supports an embodiment of the present invention.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memory storage, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
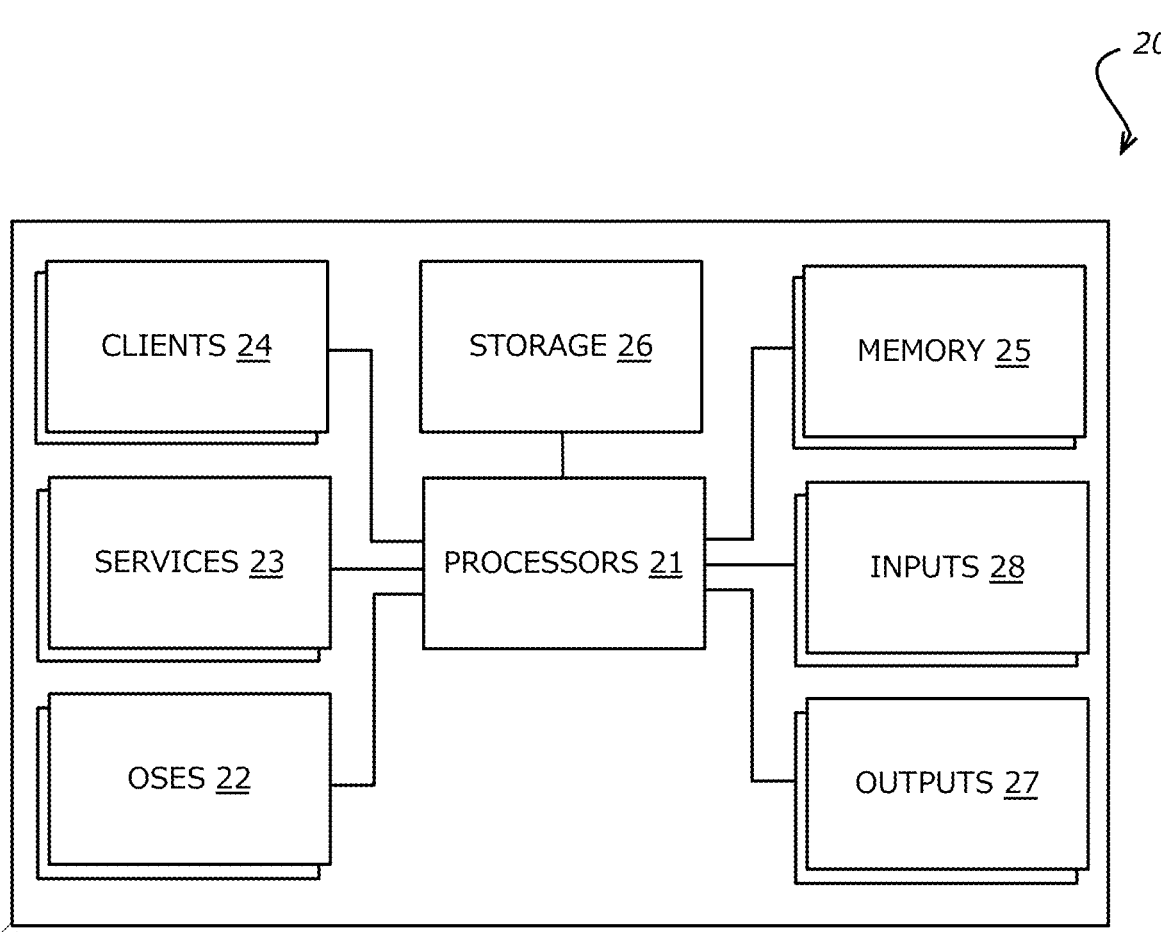
FIG. 8 illustrates an exemplary architecture of a system that supports an embodiment of the present invention.

In some embodiments, systems may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 22. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memory storage, or electrical storage device for storage of data in digital form (such as those described above, referring to FIG. 7). Examples of storage devices 26 include flash memory, magnetic hard drive, CD-ROM, and/or the like.

Figure 9:
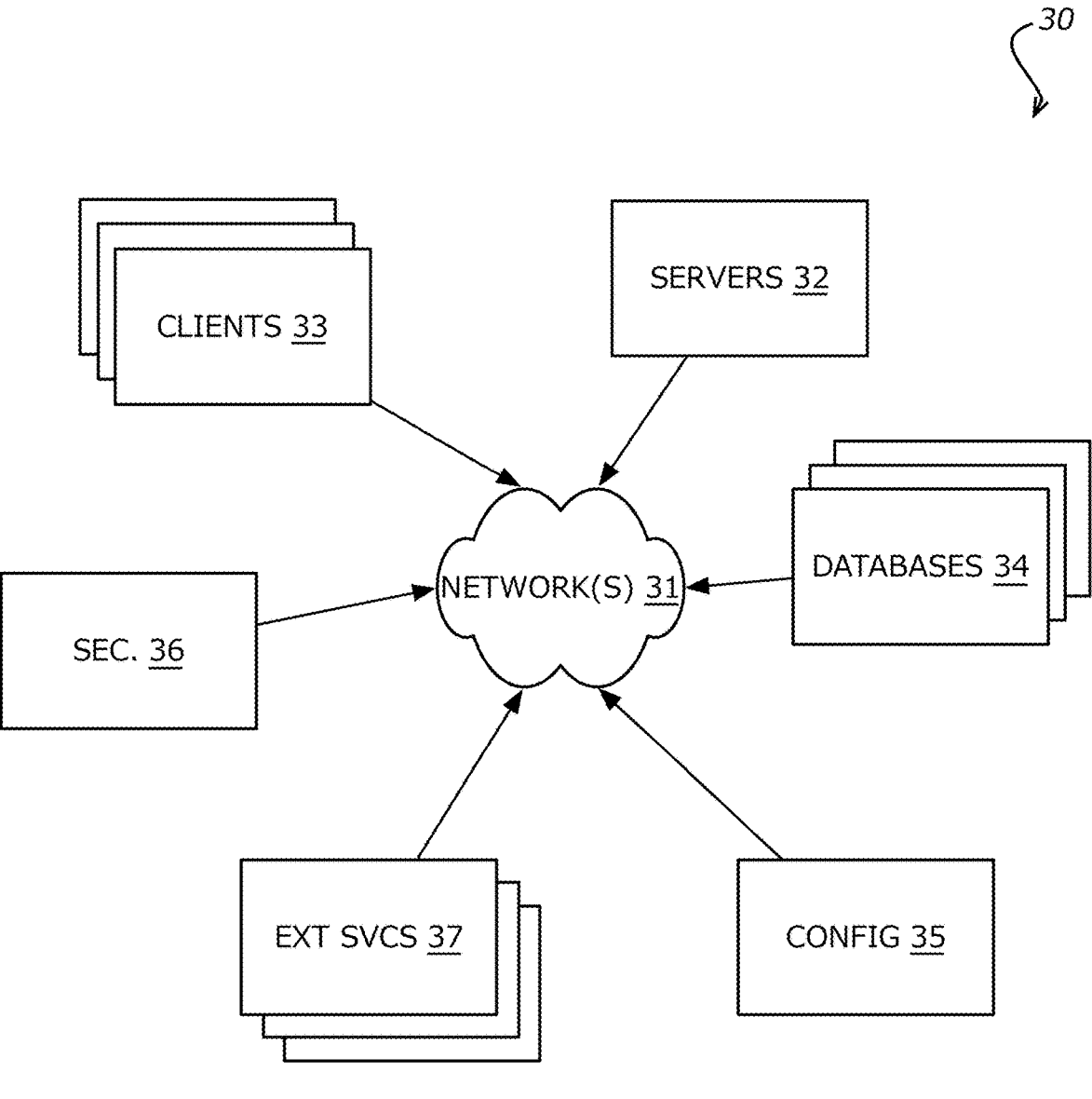
FIG. 9 illustrates another exemplary architecture of a system that supports an embodiment of the present invention.

In some embodiments, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 10:
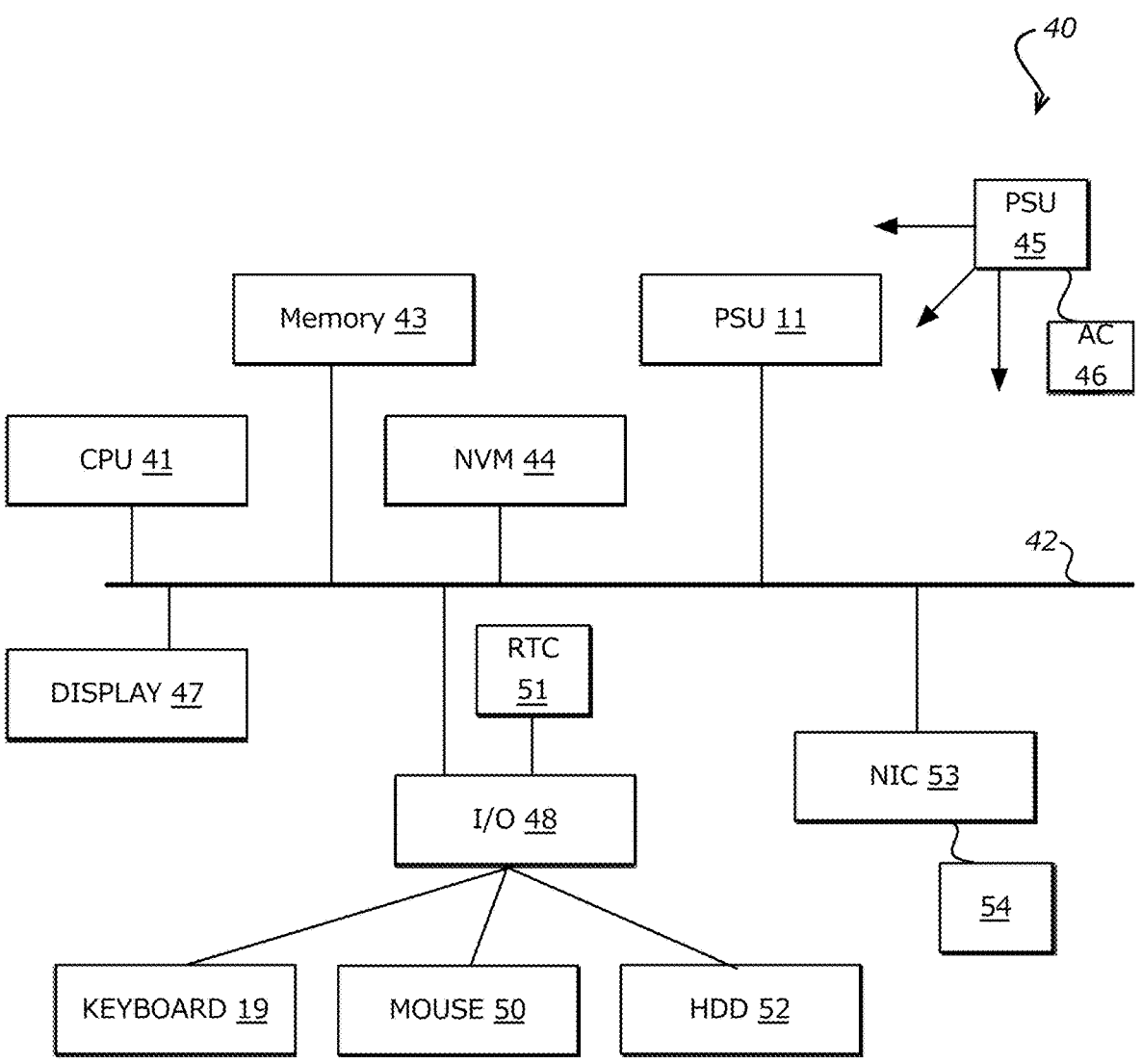
FIG. 10 illustrates components of a computer system that supports an embodiment of the present invention.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 19, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system for secure identity verification and management, comprising:

a computing device processor;

a plurality of user devices configured to communicate over a network, the network incorporating features of both decentralized blockchain architecture and centrally-managed identity verification systems; and a memory device including instructions that, when executed by the computing device processor, enables the system to:

obtain user credential data from heterogeneous data sources, the user credential data comprises at least one data element, the user credential data being unstructured and in various formats, extract the user credential data by parsing the user credential data using at least one data parsing technique to generate parsed user credential data, segment the parsed user credential data into discrete identity elements, individual discrete identity elements representing a specific attribute of an identity of a user associated with the user credential data, standardize the discrete identity elements to generate standardized discrete identity elements, wherein standardizing the discrete identity elements comprises applying formatting rules to ensure the discrete identity elements conforms to a predefined structure, map verification questions to the standardized discrete identity elements to generate verification pairs, wherein mapping comprises utilizing algorithms to match the standardized discrete identity elements with relevant question templates, transform the verification pairs into identity tokens, the identity tokens representing verified identity attributes and generated through application of cryptographic techniques, and maintain the identity tokens on a computerized ledger system.

2. The system of claim 1, wherein transforming the verification pairs into identity tokens includes converting each verification pair into a corresponding binary representation using a one-way function.

3. The system of claim 2, wherein the one-way function comprises at least one of a cryptographic hash function, a keyed-hash message authentication code (HMAC), or a hash-based message authentication code (HMAC), or a digital signature algorithm.

4. The system of claim 2, wherein the computerized ledger system is a distributed ledger system, and the corresponding binary representation is stored as transaction data on the distributed ledger system.

5. The system of claim 2, further comprising a verification system, coupled to a data repository that stores corresponding binary representations, that:

receives a verification request from a verifying party, the verification request specifying one or more attributes to be verified about the user;

retrieves the corresponding binary representation corresponding to the one or more attributes from the data repository;

compares the corresponding binary representation retrieved to the one or more attributes; and generates a verification result to the verifying party indicating whether the corresponding binary representation matches the one or more attributes, without revealing personal information to the verifying party.

6. The system of claim 5, wherein a user associated with the user credential data authorizes the verification system to release the corresponding binary representation to the verifying party by providing an authentication credential.

7. The system of claim 6, wherein the authentication credential comprises one of: a cryptographic proof, a zero-knowledge proof, or a blind signature.

8. The system of claim 1, further comprising instructions that, when executed by the computing device processor, enables the system to:

receive a verification request from a service provider, the verification request seeking to verify specific identity attributes of a user, retrieve relevant identity tokens from the computerized ledger system in response to the verification request, using a private key associated with a user to access and decode stored information on the computerized ledger system, and provide validated identity tokens in response to the verification request, allowing the service provider to make decisions based on the verified identity attributes without disclosing user data, thus preserving user privacy and ensuring data minimization.

9. The system of claim 8, further comprising instructions that, when executed by the computing device processor, enables the system to:

analyze a user consent log to verify that the user has provided consent for data sharing, prompting the user for explicit consent if required consent is not found or is insufficient.

10. The system of claim 8, further comprising instructions that, when executed by the computing device processor, enables the system to:

validate the identity tokens by cross-referencing the computerized ledger system to ensure their integrity and authenticity.

11. The system of claim 1, further comprising instructions that, when executed by the computing device processor, enables the system to:

encode the identity tokens with cryptographic authentication information, including generating digital signatures and applying encryption to protect the identity tokens, and associating the identity tokens with authentication metadata.

12. A computer-implemented method, comprising:

obtaining user credential data from heterogeneous data sources, the user credential data comprises at least one data element, the user credential data being unstructured and in various formats, extracting the user credential data by parsing the user credential data using at least one data parsing technique to generate parsed user credential data, segmenting the parsed user credential data into discrete identity elements, individual discrete identity elements representing a specific attribute of an identity of a user associated with the user credential data, standardizing the discrete identity elements to generate standardized discrete identity elements, wherein standardizing the discrete identity elements comprises applying formatting rules to ensure the discrete identity elements conforms to a predefined structure, mapping verification questions to the standardized discrete identity elements to generate verification pairs, wherein mapping comprises utilizing algorithms to match the standardized discrete identity elements with relevant question templates, transforming the verification pairs into identity tokens, the identity tokens representing verified identity attributes and generated through application of cryptographic techniques, and maintaining the identity tokens on a computerized ledger system.

13. The computer-implemented method of claim 12, wherein transforming the verification pairs into identity tokens includes converting each verification pair into a corresponding binary representation using a one-way function.

14. The computer-implemented method of claim 13, further comprising:

receiving a verification request from a verifying party, the verification request specifying one or more attributes to be verified about the user;

retrieving the corresponding binary representation;

comparing the corresponding binary representation retrieved to the one or more attributes; and generating a verification result to the verifying party indicating whether the corresponding binary representation matches the one or more attributes, without revealing personal information to the verifying party.

15. The computer-implemented method of claim 14, further comprising:

analyze a user consent log to verify that the user has provided consent for data sharing, prompting the user for explicit consent if required consent is not found or is insufficient; and validating the identity tokens by cross-referencing the computerized ledger system to ensure their integrity and authenticity.

16. The computer-implemented method of claim 14, wherein transforming the verification pairs into identity tokens includes converting each verification pair into a corresponding binary representation, and further comprising:

receiving a verification request from a verifying party, the verification request specifying one or more attributes to be verified about the user;

retrieving the corresponding binary representation corresponding from a data repository;

comparing the corresponding binary representation retrieved to the one or more attributes; and generating a verification result to the verifying party indicating whether the corresponding binary representation matches the one or more attributes, without revealing personal information to the verifying party.

17. A non-transitory computer readable storage medium storing instructions that, when executed by at least one processor of a computing system, causes the computing system to:

obtain user credential data from heterogeneous data sources, the user credential data comprises at least one data element, the user credential data being unstructured and in various formats, extract the user credential data by parsing the user credential data using at least one data parsing technique to generate parsed user credential data, segment the parsed user credential data into discrete identity elements, individual discrete identity elements representing a specific attribute of an identity of a user associated with the user credential data, standardize the discrete identity elements to generate standardized discrete identity elements, wherein standardizing the discrete identity elements comprises applying formatting rules to ensure the discrete identity elements conforms to a predefined structure, map verification questions to the standardized discrete identity elements to generate verification pairs, wherein mapping comprises utilizing algorithms to match the standardized discrete identity elements with relevant question templates, transform the verification pairs into identity tokens, the identity tokens representing verified identity attributes and generated through application of cryptographic techniques, and maintain the identity tokens on a computerized ledger system.

18. The non-transitory computer readable storage medium of claim 17, wherein the instructions, when executed by the at least one processor, further enables the computing system to:

transforming the verification pairs into identity tokens by converting each verification pair into a corresponding binary representation using a one-way function.

19. The non-transitory computer readable storage medium of claim 18, wherein the instructions, when executed by the at least one processor, further enables the computing system to:

receive a verification request from a verifying party, the verification request specifying one or more attributes to be verified about the user;

retrieve the corresponding binary representation corresponding to the one or more attributes from a data repository;

compare the corresponding binary representation retrieved to the one or more attributes; and generate a verification result to the verifying party indicating whether the corresponding binary representation matches the one or more attributes, without revealing personal information to the verifying party.

20. The non-transitory computer readable storage medium of claim 19, wherein the instructions, when executed by the at least one processor, further enables the computing system to:

use a user's private key to access and decode stored information on the computerized ledger system.

* * * * *